(12) United States Patent
Hur et al.

(10) Patent No.: US 11,394,448 B2
(45) Date of Patent: Jul. 19, 2022

(54) APPARATUS AND METHOD OF RECOVERING BEAM PATTERN IN WIRELESS COMMUNICATION SYSTEM

(71) Applicant: Samsung Electronics Co., Ltd., Suwon-si (KR)

(72) Inventors: Sooyoung Hur, Suwon-si (KR); Kyungjoong Kim, Suwon-si (KR); Jinyoung Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/887,266

(22) Filed: May 29, 2020

(65) Prior Publication Data

US 2020/0382195 A1 Dec. 3, 2020

(30) Foreign Application Priority Data

May 29, 2019 (KR) .................. 10-2019-0063354

(51) Int. Cl.
*H04B 7/06* (2006.01)
*H04W 16/28* (2009.01)
(Continued)

(52) U.S. Cl.
CPC ......... *H04B 7/0695* (2013.01); *H04B 7/0465* (2013.01); *H04B 7/0617* (2013.01); *H04B 7/0817* (2013.01); *H04W 16/28* (2013.01)

(58) Field of Classification Search
CPC .. H04B 7/0695; H04B 7/0617; H04B 7/0465; H04B 7/0817; H04B 7/043; H04B 7/0413; H04B 17/13; H04W 16/28
See application file for complete search history.

(56) References Cited

U.S. PATENT DOCUMENTS 3,049,661 A1 11/2011 Loberger
8,723,728 B2 5/2014 He et al.
(Continued)

FOREIGN PATENT DOCUMENTS

EP 2 632 058 A1 8/2013
WO 2017/196612 A1 11/2017

OTHER PUBLICATIONS

International Search Report and Written Opinion dated Sep. 9, 2020, issued in International Application No. PCT/KR2020/007035.
(Continued)

*Primary Examiner* — Minh Trang T Nguyen
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). An operation method of a communication node in a wireless communication system is provided. The operation method includes generating a default beam pattern, based on a plurality of radio-frequency (RF) paths, by applying beamforming parameters, detecting a path failure associated with at least one RF path among the plurality of RF paths, identifying beamforming parameters based on the default beam pattern in response to the detection, and generating a recovered beam pattern associated with the default beam pattern based on the identified beamforming parameters, wherein the beamforming parameters for generating the recovered beam pattern are determined based on a shape of the default beam pattern.

20 Claims, 16 Drawing Sheets

(51) Int. Cl.
H04B 7/0456 (2017.01)
H04B 7/08 (2006.01)

(56) References Cited

U.S. PATENT DOCUMENTS

| | | |
|---|---|---|
| 9,318,804 B2 | 4/2016 | Weckerle et al. |
| 9,780,446 B1 | 10/2017 | Yu |
| 2010/0184449 A1 | 7/2010 | Kim et al. |
| 2011/0150050 A1 | 6/2011 | Trigui et al. |
| 2016/0128668 A1* | 5/2016 | Jain .................. G01S 15/899 600/424 |
| 2018/0279287 A1 | 9/2018 | Wilson et al. |
| 2019/0037423 A1 | 1/2019 | Yu et al. |

OTHER PUBLICATIONS

Extended European Search Report dated Jun. 2, 2022, issued in a counterpart European Application No. 20814801.5.

* cited by examiner

APPARATUS AND METHOD OF RECOVERING BEAM PATTERN IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0063354, filed on May 29, 2019, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for recovering a beam pattern in a wireless communication system.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid Frequency Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A wireless network operates to increase signal gain using a beamforming scheme. A beam pattern that provides desired coverage may be formed by controlling the phase or power applied to each antenna. In this instance, if a radio-frequency (RF) path connected to some antennas operates abnormally, the beam pattern may change.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for recovering a beam pattern in a wireless communication system.

Another aspect of the disclosure is to provide a method and apparatus for performing recovery due to insufficient coverage in a wireless communication system.

Another aspect of the disclosure is to provide a method and apparatus for improving beam coverage in a wireless communication system.

Another aspect of the disclosure is to provide a method and apparatus for compensating for a radio-frequency (RF) path failure in a wireless communication system.

Another aspect of the disclosure is to provide a method and apparatus for increasing cell capacity in a wireless communication system.

Another aspect of the disclosure is to provide a method and apparatus for performing an optimization operation between network entities in a hierarchical structure in a wireless communication system.

Additional aspects will be set forth in part in the description which follows and, in part, will be apparent from the description, or may be learned by practice of the presented embodiments.

In accordance with an aspect of the disclosure, an operation method of a communication node in a wireless communication system is provided. The operation method includes generating a default beam pattern, based on a plurality of radio-frequency (RF) paths, by applying beamforming parameters, detecting a path failure associated with at least one RF path among the plurality of RF paths, identifying beamforming parameters based on the default beam pattern in response to the detection, and generating a recovered beam pattern associated with the default beam pattern based on the identified beamforming parameters, wherein the beamforming parameters for generating the recovered beam pattern are determined based on the shape of the default beam pattern.

In accordance with another aspect of the disclosure, an operation method of a server in a wireless communication system is provided. The operation method includes receiving information indicating detection of a path failure associated with at least one radio-frequency (RF) path among a plurality of RF paths of a communication node, identifying a beamforming combination among combinations of beamforming parameters associated with the plurality of RF paths, and transmitting information indicating the identified beamforming combination to the communication node.

In accordance with another aspect of the disclosure, a communication node apparatus in a wireless communication system is provided. The communication node includes at least one transceiver and at least one processor, wherein the at least one processor is configured to generate a default beam pattern, based on a plurality of radio-frequency (RF) paths, by applying beamforming parameters, detect a path failure associated with at least one RF path among the plurality of RF paths, identify beamforming parameters based on the default beam pattern in response to the detection, and generate a recovered beam pattern related to the default beam pattern, based on the identified beamforming parameters, and wherein the beamforming parameters for generating the recovered beam pattern are determined based on the shape of the default beam pattern.

In accordance with another aspect of the disclosure, a server apparatus in a wireless communication system is provided. The server apparatus includes at least one transceiver and at least one processor, wherein the at least one processor is configured to receive information indicating detection of a path failure associated with at least one radio-frequency (RF) path among a plurality of RF paths of a communication node, identify a beamforming combination among combinations of beamforming parameters associated with the plurality of RF paths, and transmit information indicating the identified beamforming combination to the communication node.

A method and apparatus according to various embodiments may recover a beam pattern so as to perform compensation associated with beam coverage.

Other aspects, advantages, and salient features of the disclosure will become apparent to those skilled in the art from the following detailed description, which, taken in conjunction with the annexed drawings, discloses various embodiments the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
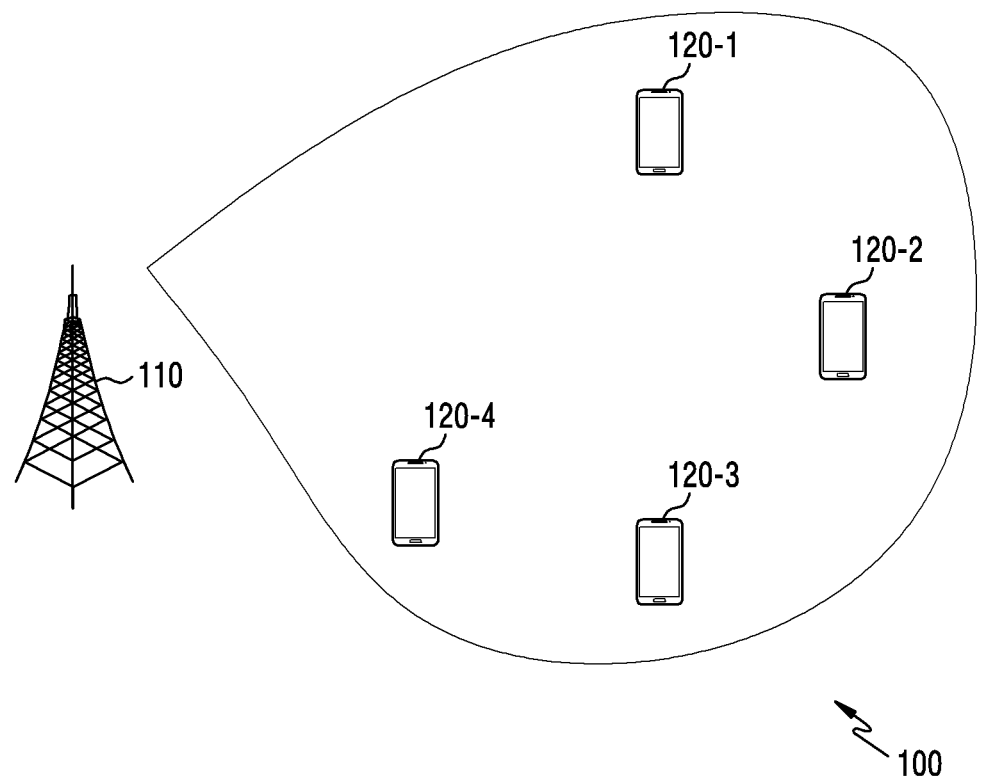
FIG. 1 is a diagram illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure relates to a method and an apparatus for managing beam coverage in a wireless communication system. Particularly, the disclosure describes technology for recovering a beam pattern so as to form beam coverage that is substantially similar to existing beam coverage, if a radio-frequency (RF) path operates abnormally in a wireless communication system.

Hereinafter, terms that refer to signals ("signal," "symbol," "stream," "data," or "beamforming signal"), terms related to beams ("multi-beam," "plurality of beams," "single beam," "dual-beam," "quad-beam," or "beamforming"), terms that refer to components of an apparatus ("antenna array," "antenna element," "communication unit," "antenna"), terms that refer to network entities (e.g., "communication node," "radio node," "radio unit," "network node," "transmission/reception point (TRP)"), and the like, which are used in the descriptions below, are provided for ease of description. Therefore, the disclosure is not limited to the terms used in the descriptions, and other terms having the same technical meaning may be used.

Hereinafter, the metrics for signal gain, signal quality, or the like used in the descriptions may be, for example, at least one of a beam reference signal received power (BRSRP), a reference signal received power (RSRP), a reference signal received quality (RSRQ), a received signal strength indicator (RSSI), a signal-to-interference-and-noise ratio (SINR), a carrier-to-interference-and-noise ratio (CINR), SNR, an error vector magnitude (EVM), a bit error rate (BER), and a block error rate (BLER). In addition to the above-mentioned examples, other terms having technically the same meaning or other indices (metrics) indicating signal quality may be used.

Although the disclosure describes various embodiments using terms according to some communication standards (e.g., 3rd-generation partnership project (3GPP)), the embodiments are merely examples. Various embodiments may be easily modified and applied to other communication systems.

FIG. 1 is a diagram illustrating a wireless communication system according to an embodiment of the disclosure.

FIG. 1 illustrates a base station 110, a terminal 120-1, a terminal 120-2, a terminal 120-3, and a terminal 120-4, as some of the nodes that use wireless channels in a wireless communication system. The wireless communication environment 100 of FIG. 1 may be a coverage environment that is common to terminals via a wide beam pattern.

The base station 110 may be a network infrastructure element that provides radio access to the terminals 120-1, 120-2, 120-3, and 120-4. The base station 110 may have coverage defined by a predetermined geographical area based on the distance over which the base station 110 is capable of transmitting a signal. Hereinafter, the term 'coverage' used in the descriptions may refer to a service coverage area of the base station 110. The base station 110 may cover one cell, or may cover multiple cells. Here, the multiple cells may be distinguished based on the frequencies that each cell supports and the area of a sector that each cell covers. The base station 110 may provide radio access to the terminals 120-1, 120-2, 120-3, and 120-4 via beamforming, and coverage may be referred to as beam coverage.

The base station 110 may also be referred to as an "access point (AP)," an "evolved NodeB (eNB)," a "$5^{th}$-generation (5G) node," a "5G NodeB (5G NB)," a "next-generation nodeB (gNB)," a "wireless point," a "transmission/reception point (TRP)," a "distributed unit (DU)," a "radio unit (RU)," a "remote radio head (RRH)," or using another term having technical meaning equivalent thereto, in addition to "base station." According to various embodiments, the base station 110 may be connected to one or more transmission/reception points (TRP). The base station 110 may transmit a downlink signal to the terminals 120-1, 120-2, 120-3, and 120-4, or may receive an uplink signal, via one or more TRPs.

Each of the terminals 120-1, 120-2, 120-3, and 120-4 may be a device used by a user, and may communicate with the base station 110 via a wireless channel Depending on the case, at least one of the terminals 120-1, 120-2, 120-3 and 120-4 may operate without being manipulated by a user. That is, at least one of the terminals 120-1, 120-2, 120-3, and 120-4 is a device that performs machine-type communication (MTC) and may not be carried by a user. Each of the terminals 120-1, 120-2, 120-3, and 120-4 may be referred to as a "user equipment (UE)," a "mobile station," a "subscriber station," a "customer premises equipment (CPE)," a "remote terminal," a "wireless terminal," an "electronic device," a "vehicle terminal," a "user device," or using another term having technical meaning equivalent thereto, in addition to "terminal." Hereinafter, for ease of description, the description which is applicable to the terminals 120-1, 120-2, 120-3, and 120-4 in common will be described representatively using a terminal 120.

FIG. 1 illustrates that a signal is transmitted via a common beam which is common to terminals within the coverage area of the base station 110. However, according to some embodiments, the base station 110 may transmit or receive a wireless signal in a millimeter-wave (mmWave) band (e.g., 28 GHz, 30 GHz, 38 GHz, or 60 GHz). In the same manner, the terminal 120 may also transmit or receive a wireless signal in a millimeter-wave (mmWave) band. In this instance, in order to increase a channel gain, the base station 110 and the terminal 120 may perform beamforming. Beamforming may include transmission beamforming and reception beamforming. To this end, the base station 110 and the terminals 120-1, 120-2, . . . 120-4 may select respective serving beams via a beam search procedure or a beam management procedure. Here, after a serving beam is selected, communication may be performed via a resource which is in a quasi-co-located (QCL) relationship with the resource used for transmitting the serving beam.

If large-scale characteristics of a channel that delivers a symbol on a first antenna port can be inferred from a channel that delivers a symbol on a second antenna port, it is estimated that the first antenna port and the second antenna port have a QCL relationship therebetween. For example, the large-scale characteristics may include at least one of a delay spread, a Doppler spread, a Doppler shift, an average gain, an average delay, and a spatial receiver parameter.

Figure 2:
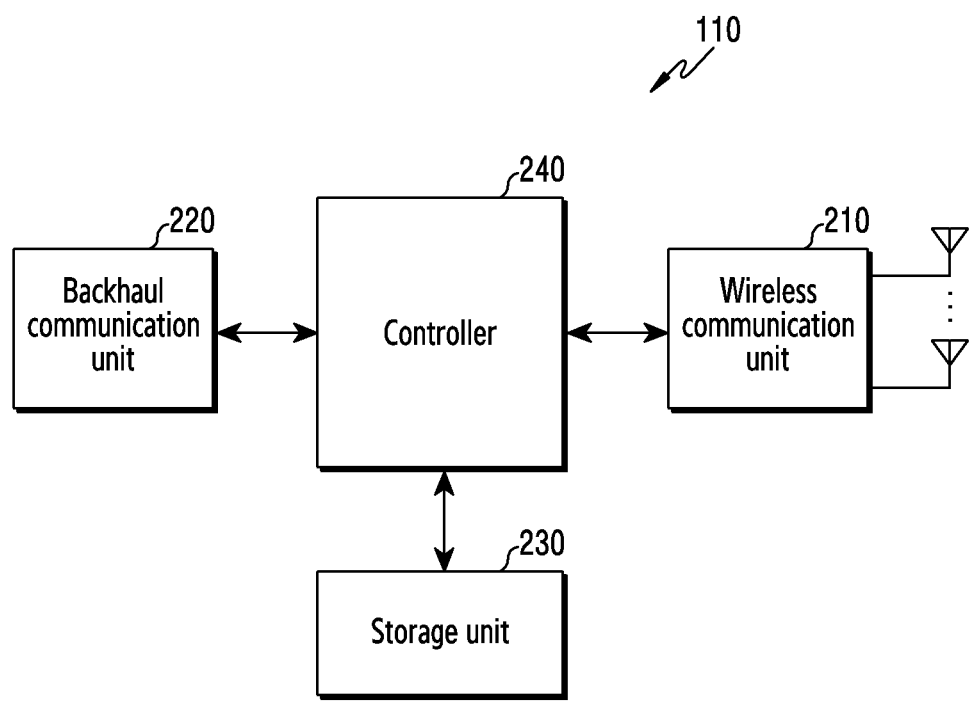
FIG. 2 is a block diagram illustrating the configuration of a base station in a wireless communication system according to an embodiment of the disclosure.

FIG. 2 is a block diagram illustrating the configuration of a base station in a wireless communication system according to an embodiment of the disclosure.

The configuration of FIG. 2 may be understood as the configuration of the base station 110. The ending "unit" or "-er" used hereinafter may refer to a unit for processing at least one function or operation, and may be implemented as hardware, software, or a combination of hardware and software.

Referring to FIG. 2, the base station 110 may include a wireless communication unit 210, a backhaul communication unit 220, a storage unit 230, and a controller 240.

The wireless communication unit 210 performs functions of transmitting or receiving a signal via a wireless channel. For example, the wireless communication unit 210 performs a function of conversion between a baseband signal and a bitstream according to the physical-layer standard of a system. For example, in the case of data transmission, the wireless communication unit 210 generates complex symbols by encoding and modulating a transmission bitstream. Also, in the case of data reception, the wireless communication unit 210 restores a reception bitstream by demodulating and decoding a baseband signal. Also, the wireless communication unit 210 up-converts a baseband signal into a radio-frequency (RF) band signal and transmits the same via an antenna, and down-converts an RF band signal received via an antenna into a baseband signal.

To this end, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include a plurality of transmission/reception paths. In addition, the wireless communication unit 210 may include at least one antenna array including a plurality of antenna elements. From the perspective of hardware, the wireless communication unit 210 may be configured with a digital unit and an analog unit. The analog unit may include a plurality of subunits depending on the operating power, operating frequency, or the like. According to various embodiments, the wireless communication unit 20 may include a unit for forming a beam, that is, a beamforming unit. For example, the wireless communication unit 210 may include a massive MIMO unit (MMU) for beamforming.

The wireless communication unit 210 may transmit or receive a signal. For example, the wireless communication unit 210 may transmit a synchronization signal, a reference signal, system information, a message, control information, data, or the like. In addition, the wireless communication unit 210 may perform beamforming. The wireless communication unit 210 may apply a beamforming weight value to a signal desired to be transmitted or received, in order to assign directionality according to settings by the controller 240.

The wireless communication unit 210 may transmit or receive a signal as described above. Accordingly, the entirety or a part of the wireless communication unit 210 may be referred to as a "transmitter," "receiver," or "transceiver." Also, the transmission and reception performed via a wireless channel, which is described in the following descriptions, may be understood to include the case in which the above-described processing is performed by the wireless communication unit 210.

The backhaul communication unit 220 provides an interface for performing communication with other nodes within the network. That is, the backhaul communication unit 220 may convert, into a physical signal, a bitstream transmitted from the base station 110 to another node, for example, another access node, another base station, a upper node, a core network, and the like, and may convert a physical signal received from another node into a bitstream.

The storage unit 230 may store data, such as basic programs for operating the base station 110, application programs, configuration information, and the like. The storage unit 230 may be implemented as volatile memory, nonvolatile memory, or a combination of volatile memory and nonvolatile memory. In addition, the storage unit 230 may provide data stored therein in response to a request from the controller 240. According to various embodiments, the storage unit 230 may store direction information (or angle information) associated with each beam of a beam set or each beam of an auxiliary beam pair (ABP) to be operated by the base station 110. According to an embodiment, the direction information may be expressed in the form of an array response vector.

The controller 240 controls the overall operation of the base station 110. For example, the controller 240 may transmit and receive a signal via the wireless communication unit 210 or the backhaul communication unit 220. Further, the controller 240 records data in the storage unit 230 and reads the recorded data. The controller 240 may perform the functions of a protocol stack that the communication standard requires. To this end, the controller 240 may include at least one processor. According to various embodiments, the controller 240 may perform control so that the base station 110 performs operations according to various embodiments described below.

The configuration of the base station illustrated in FIG. 2 is merely an example of a base station, and a base station that performs various embodiments of the disclosure is not limited to the illustrated configuration of FIG. 2. That is, according to various embodiments, some components may be added, removed, or changed.

Although a base station is illustrated as a single entity in FIG. 2, the disclosure is not limited thereto. A base station according to various embodiments may be implemented to form an access network having a distributed deployment, in addition to an integrated deployment. According to an embodiment, a base station may be implemented so that a central unit (CU) and a distributed unit (DU) are separated, and the CU performs a higher-layer function (e.g., packet data convergence protocol (PDCP), RRC), and the DU performs a lower-layer function (e.g., medium access control (MAC) or physical (PHY)). The DU of the base station may form beam coverage on a wireless channel According to another embodiment, a digital unit (DU) may be configured instead of the CU, and a radio unit (RU) may be configured instead of the DU, so that the RU of the base station may form beam coverage on a wireless channel.

Figure 3:
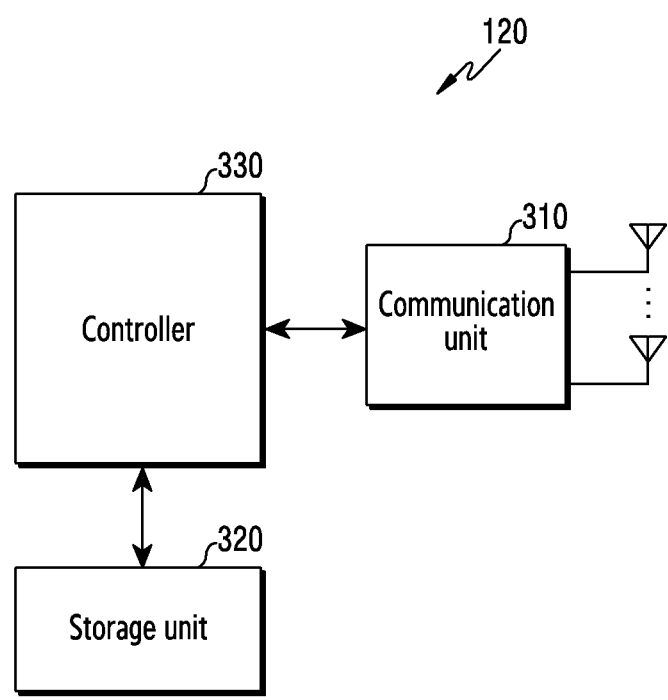
FIG. 3 is a block diagram illustrating the configuration of a terminal in a wireless communication system according to an embodiment of the disclosure.

FIG. 3 is a block diagram illustrating the configuration of a terminal in a wireless communication system according to an embodiment of the disclosure.

The configuration illustrated in FIG. 3 may be understood as the configuration of the terminal 120. The ending "unit" or "-er" used hereinafter may refer to a unit for processing at least one function or operation, and may be implemented as hardware, software, or a combination of hardware and software.

Referring to FIG. 3, the terminal 120 includes a communication unit 310, a storage unit 320, and a controller 330.

The communication unit 310 performs functions of transmitting or receiving a signal via a wireless channel. For example, the communication unit 310 may perform a function of conversion between a baseband signal and a bitstream according to the physical-layer standard of a system. For example, in the case of data transmission, the communication unit 310 generates complex symbols by encoding and modulating a transmission bitstream. In the case of data reception, the communication unit 310 reconstructs a reception bitstream by demodulating and decoding a baseband signal. The communication unit 310 up-converts a baseband signal into an RF band signal and transmits the same via an antenna, and down-converts an RF band signal received via an antenna into a baseband signal. For example, the communication unit 310 may include a transmission filter, a reception filter, an amplifier, a mixer, an oscillator, a DAC, an ADC, and the like.

The communication unit 310 may include a plurality of transmission/reception paths. In addition, the communication unit 310 may include an antenna unit. The communication unit 310 may include at least one antenna array including a plurality of antenna elements. From the perspective of hardware, the communication unit 310 may include a digital circuit and an analog circuit (e.g., a radio-frequency integrated circuit (RFIC)). Here, the digital circuit and the analog circuit may be implemented as a single package. The communication unit 310 may include a plurality of RF chains. The communication unit 310 may perform beamforming. The communication unit 310 may apply a beamforming weight value to a signal desired to be transmitted or received, in order to assign directionality according to settings by the controller 330. According to an embodiment, the communication unit 310 may include a radio-frequency (RF) block (or RF unit). The RF block may include a first RF circuit related to an antenna and a second RF circuit related to baseband processing. The first RF circuit may be referred to as an RF-antenna (RF-A) circuit. The second RF circuit may be referred to as an RF-baseband (RF-B) circuit.

The communication unit 310 may transmit or receive a signal. The communication unit 310 may receive a downlink signal. The downlink signal may include a synchronization signal (SS), a reference signal (RS) (e.g., a cell-specific reference signal (CRS) or a demodulation reference signal (DM)-RS), system information (e.g., master information block (MIB), system information block (SIB), or remaining system information (RMSI), or other system information (OSI)), a configuration message, control information, downlink data, or the like. The communication unit 310 may transmit an uplink signal. The uplink signal may include a random-access-related signal (e.g., a random-access preamble (RAP) (or message 1 (Msg1) or message 3 (Msg3)), or a reference signal (e.g., a sounding reference signal (SRS) or a DM-RS), or the like. The communication unit 310 may include different communication modules for processing signals in different frequency bands. Furthermore, the communication unit 310 may include a plurality of communication modules to support a plurality of different radio access technologies. For example, the different radio access technologies may include Bluetooth low energy (BLE), wireless fidelity (Wi-Fi), Wi-Fi gigabyte (WiGig), a cellular network (e.g., long-term evolution (LTE) or new radio (NR)), and the like. Further, the different frequency bands may include a super-high-frequency (SHF) (e.g., 2.5 GHz and 5 GHz) band and a millimeter (mm)-wave (e.g., 38 GHz, 60 GHz, and the like) band. The communication unit 310 may use the same radio access technology in different frequency bands (e.g., a non-licensed band for licensed assisted access (LAA) and a citizens broadband radio service (CBRS) (e.g., 3.5 GHz)).

The communication unit 310 may transmit or receive a signal as described above. Accordingly, the entirety or a part of the communication unit 310 may be referred to as a "transmitter," "receiver," or "transceiver." The transmission and reception performed via a wireless channel, which is described in the following descriptions, may be understood to include the case in which the above-described processing is performed by the communication unit 310.

The storage unit 320 may store data such as basic programs for operation of the terminal 120, application programs, configuration information, and the like. The storage unit 320 may be implemented as volatile memory, nonvolatile memory, or a combination of volatile memory and nonvolatile memory. The storage unit 320 may provide data stored therein in response to a request from the controller 330. According to various embodiments, the storage unit 320 may store direction information associated with each beam of a beam set or each beam of an auxiliary beam pair (ABP) to be operated by the terminal 120.

The controller 330 controls the overall operation of the terminal 120. For example, the controller 330 may transmit or receive a signal via the communication unit 310. Further, the controller 330 records data in the storage unit 320 and reads the recorded data. The controller 330 may perform the functions of a protocol stack that the communication standard requires. To this end, the controller 330 may include at least one processor or microprocessor, or may be a part of the processor. A part of the communication unit 310 and the controller 330 may be referred to as a CP. The controller 330 may include various modules for performing communication. According to various embodiments, the controller 330 may perform control so that a terminal performs operations according to various embodiments described below.

A beamforming technology may be used as one of the technologies for decreasing a propagation path loss and for increasing a delivery distance of electromagnetic waves. Beamforming may concentrate areas where electromagnetic waves arrive via multiple antennas, or may increase the directivity of reception sensitivity in a predetermined direction. Accordingly, a communication node may include multiple antennas in order to form beamforming coverage, instead of forming a signal in an isotropic pattern using a single antenna. The communication node according to various embodiments may include an MMU. In this instance, the form in which multiple antennas are gathered may be referred to as an "antenna array," and each antenna included in an array may be referred to as an "array element" or an "antenna element." The antenna array may be configured in various forms, such as a linear array, a planar array, and the like. The antenna array may be referred to as a massive antenna array.

Hereinafter, an antenna array will be described as an example of a plurality of antennas for communication in a multiple-input multiple-output (MIMO) environment. However, according to some embodiments, that may be easily changeable for beamforming Hereinafter, an example of beamforming architecture will be described with reference to FIGS. 4A to 4C.

Figure 4A:
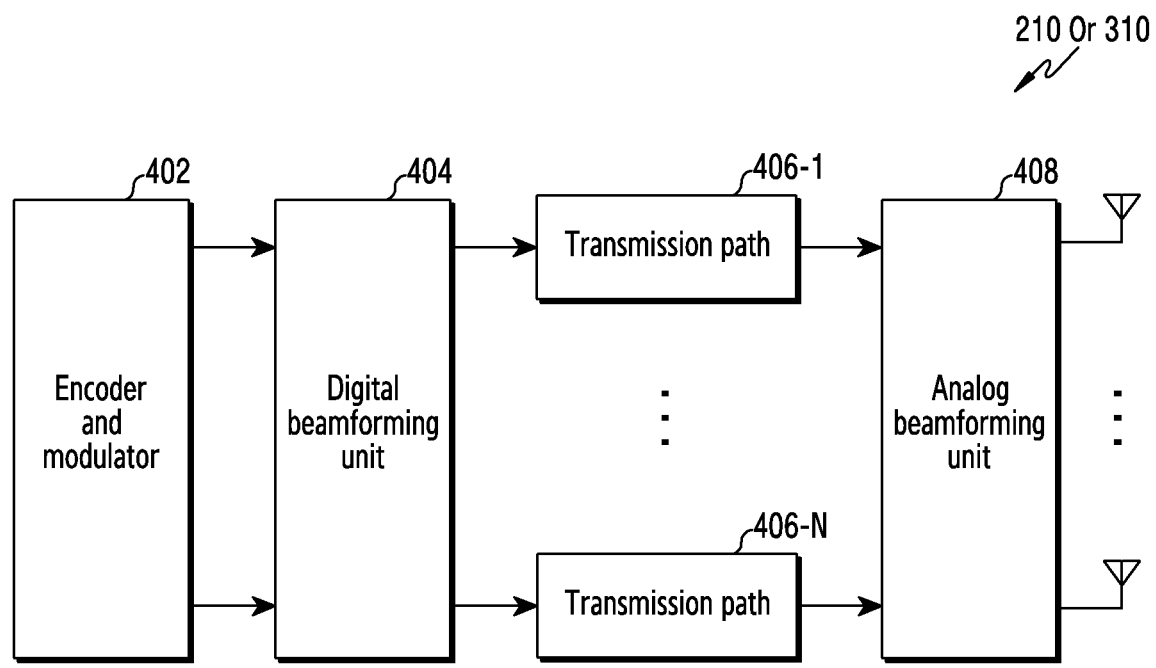
FIG. 4A is a diagram illustrating the configuration of a communication unit in a wireless communication system according to an embodiment of the disclosure.

FIG. 4A is a diagram illustrating the configuration of a communication unit in a wireless communication system according to an embodiment of the disclosure.

Figure 4B:
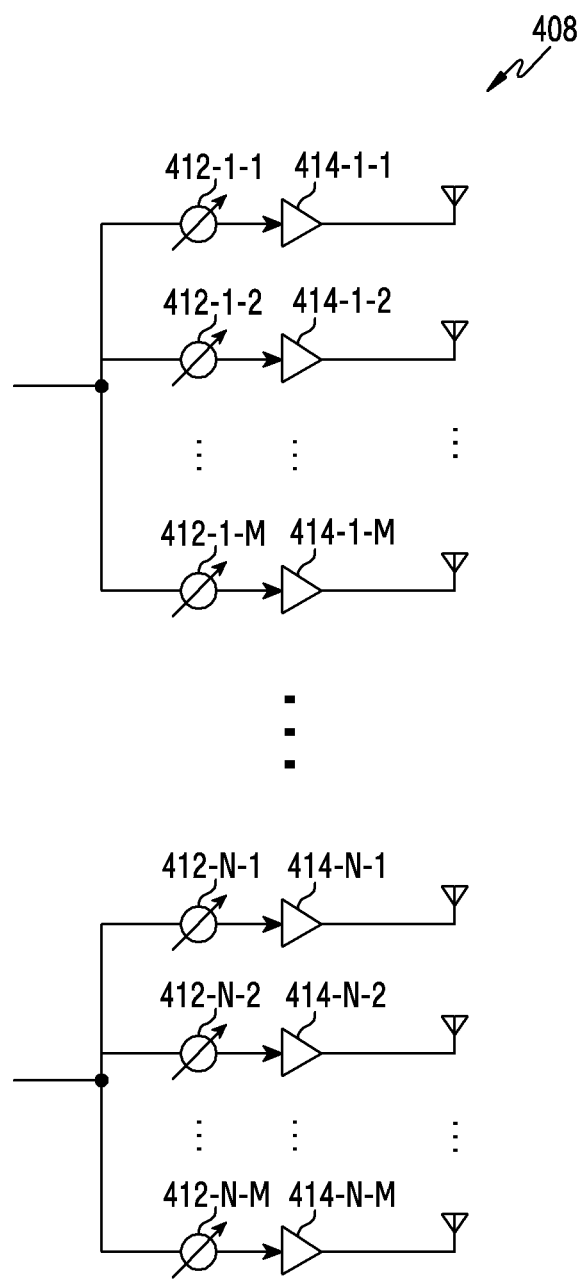
FIG. 4B is a diagram illustrating the configuration of a communication unit in a wireless communication system according to an embodiment of the disclosure.

FIG. 4B is a diagram illustrating the configuration of a communication unit in a wireless communication system according to an embodiment of the disclosure.

Figure 4C:
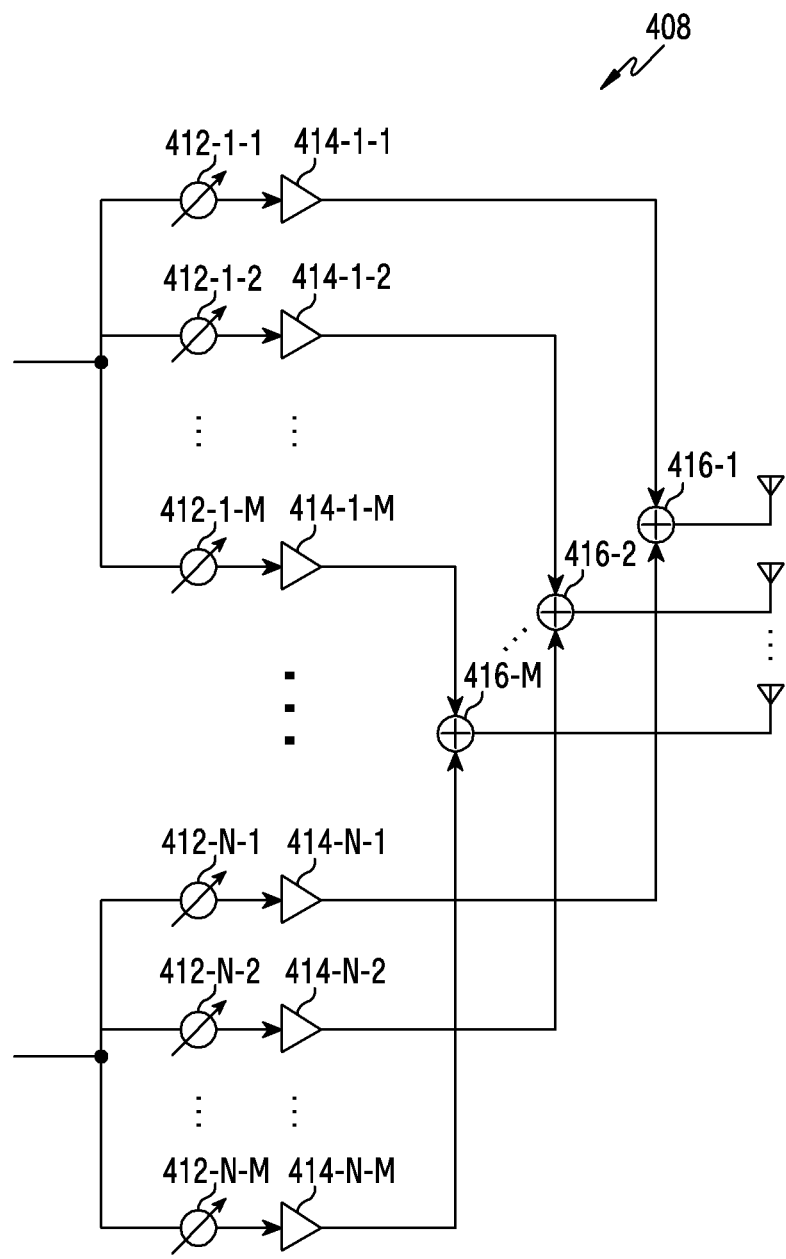
FIG. 4C is a diagram illustrating the configuration of a communication unit in a wireless communication system according to an embodiment of disclosure.

FIG. 4C is a diagram illustrating the configuration of a communication unit in a wireless communication system according to an embodiment of the disclosure.

FIGS. 4A to 4C illustrate examples of the detailed configuration of the wireless communication unit 210 of FIG. 2 or the communication unit 310 of FIG. 3. Particularly, FIGS. 4A to 4C illustrate components for performing beamforming, which correspond to a part of the wireless communication unit 210 of FIG. 2 or the communication unit 310 of FIG. 3.

Referring to FIG. 4A, the wireless communication unit 210 or the communication unit 310 may include an encoder and modulator 402, a digital beamforming unit 404, a plurality of transmission paths 406-1 to 406-N, and an analog beamforming unit 408.

The encoder and modulator 402 may perform channel encoding. To perform channel encoding, at least one of low-density parity-check (LDPC) code, turbo code, block code, convolution code, and polar code may be used. The encoder and modulator 402 may perform constellation mapping so as to generate modulated symbols.

The digital beamforming unit 404 may perform beamforming of a digital signal (e.g., modulated symbols). To this end, the digital beamforming unit 404 may multiply modulated symbols by beamforming weights. Here, the beamforming weights may be used to change the size and phase of a signal, and may be referred to as a "precoding matrix," "precoder," or the like. The digital beamforming unit 404 may output digital-beamformed modulated symbols to the plurality of transmission paths 406-1 to 406-N. In this instance, according to a multiple-input multiple-output (MIMO) transmission scheme, the modulated symbols may be multiplexed, or the same modulated symbols may be provided to the plurality of transmission paths 406-1 to 406-N.

The plurality of transmission paths 406-1 to 406-N may change the digital-beamformed digital signals into analog signals. Particularly, the signal streams may be processed in a baseband. Subsequently, the signal streams may be converted by a digital-analog converter (DAC). Each information stream may be additionally processed according to up-conversion (e.g., intermediate-frequency (IF) conversion and radio-frequency (RF) conversion) that converts a baseband signal into an RF carrier-wave band signal. According to some embodiments, a single stream may be divided into an in-phase component (I component) and a quadrature phase component (Q component), in order to perform modulation. After up-conversion, each processed stream may be input to the analog beamforming unit 408. To this end, each of the plurality of transmission paths 406-1 to 406-N may include an inverse fast Fourier transform (IFFT) operation unit, a cyclic prefix (CP) insertion unit, a DAC, and an up-converter. The CP insertion unit is used for an orthogonal frequency-division multiplexing (OFDM) scheme, and may be excluded if another physical-layer scheme (e.g., filter bank multi-carrier (FBMC)) is applied. That is, the plurality of transmission paths 406-1 to 406-N may provide an independent signal-processing process to a plurality of streams generated by digital beamforming Depending on the implementation scheme, some of the components of the plurality of transmission paths 406-1 to 406-N may be used in common.

The analog beamforming unit 408 may perform beamforming with respect to analog signals. To this end, the analog beamforming unit 408 may multiply analog signals by beamforming weights. Here, the beamforming weights may be used to change the size and phase of signals. Particularly, according to the connection structure between multiple transmission paths 406-1 to 406-N and antennas, the analog beamforming unit 408 may be implemented as shown in FIG. 4B or 4C.

Referring to FIG. 4B, the analog beamforming unit 408 shows an example of an architecture associated with a beamforming module in which a signal output in baseband processing is connected to a phase/size converter and an amplifier of a sub-array of an antenna array. The phase/size converter may include a phase shifter. The amplifier may include a power amplifier (PA). Particularly, each of the signals output from the up-converter may be input to the phase/size converter and amplifier of a sub-array of an antenna array, and the sub-array may include one or more antenna elements. According to an embodiment, each sub-array may include the same number of antenna elements. According to another embodiment, the number of antenna elements of some sub-arrays may be different from each other. Each output signal may be connected to some or all of the antennas of a sub-array.

Signals input to the analog beamforming unit 408 may go through phase/size conversion and amplification operations, and may be transmitted via antennas. In this instance, signals in respective paths may be transmitted via different antenna sets, that is, via different antenna arrays. For example, referring to signal processing associated with a signal input via a first path, the signal is converted into signal streams having different or identical phases and sizes by phase/size converters 412-1-1 to 412-1-M, and the signal streams are amplified by amplifiers 414-1-1 to 414-1-M, and may be transmitted via antennas. Similarly, referring to signal processing associated with a signal input via an Nth path, the signal is converted into signal streams having different or identical phases and sizes by phase/size converters 412-N-1 to 412-N-M, and the signal streams are amplified by amplifiers 414-N-1 to 414-N-M, and may also be transmitted via antennas Referring to FIG. 4C, the analog beamforming unit 408 shows an example of an architecture associated with a beamforming module in which signals are completely connected to all phase/size converters and amplifiers of transmission antennas. Particularly, each of the signals output from an up-converter may be input to a single phase/size converter and a single amplifier, and all signals may be coupled by a coupler and may be output to one of the antennas of an antenna array.

Signals input to the analog beamforming unit 408 may go through phase/size conversion and amplification operations, and may be transmitted via antennas. Signals in respective paths may be transmitted via the same antenna set, that is, via the same antenna array. Referring to signal processing associated with signal input via a first path, the signal is converted into signal streams having different or identical phases and sizes by the phase/size converters 412-1-1 to 412-1-M, and the signal streams are amplified by amplifiers 414-1-1 to 414-1-M. To enable the amplified signals to be transmitted via a single antenna array, the amplified signals may be added up based on an antenna element by a coupler 416-1-1 to 416-1-M, and may be transmitted via antennas.

FIG. 4B illustrates an example of using an independent antenna array for each transmission path, and FIG. 4C illustrates an example in which transmission paths share a single antenna array. However, according to another embodiment, some transmission paths may use independent antenna arrays, and the other transmission paths may share a single antenna array. Furthermore, according to another embodiment, a switchable structure is applied to transmission paths and antenna arrays, and the structure may be adaptively changed depending on the situation. According to various embodiments, the controller 240 of FIG. 2 may be operatively connected to at least one of the above-described component elements, the up-converter, the beamforming module, the phase/size converter, the amplifier, or the antenna array module so as to enable interoperation therebetween. For example, components for performing processing related to a single sub-array of an antenna array may be referred to as a single "RF chain." For example, components connected to a single controllable phase/size converter may be referred to as an RF path.

A description has been made in connection with FIGS. 4A to 4C of the configurations of a communication environment, a base station, and a terminal for estimating a direction according to various embodiments. Hereinafter, with reference to FIGS. 5 and 6, an example of the situation in which coverage loss is incurred by beamforming is illustrated, and terms related to beam pattern recovery for compensating for the coverage loss are defined.

Figure 5:
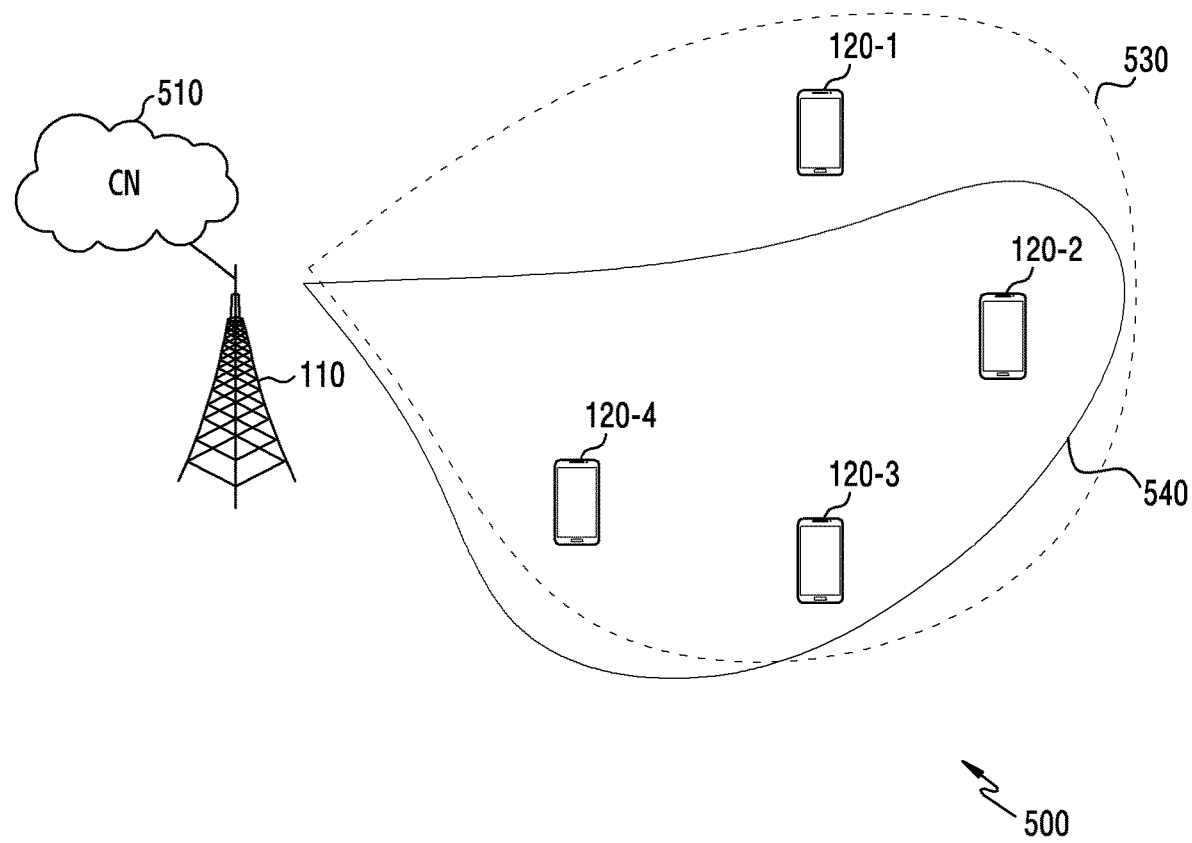
FIG. 5 is a diagram illustrating an example of beam distortion in a wireless communication system according to an embodiment of the disclosure.

FIG. 5 is a diagram illustrating an example 500 of beam distortion in a wireless communication system according to an embodiment of the disclosure.

The wireless communication system may include the base station 110 and the terminals 120-1, 120-2, 120-3, and 120-4 of FIG. 1.

Referring to FIG. 5, the base station 110 may be connected to a core network (CN) 510. The core network 510 may assist an access network environment that the base station 110 forms. For example, the core network 510 may provide a connection to an operator server for management of the base station 110. Also, the core network 510 may assist communication of the terminals 120-1, 120-2, 120-3, and 120-4 via the base station 110. For example, the core network 510 may perform authentication, charging, end-to-end connection management, and the like for the terminal 120-1. According to various embodiments, the core network 510 may include an evolved packet core (EPC) or a 5G core.

The base station 110 may provide a beam pattern 530. That is, the base station 110 may form the beam pattern 530. A beam pattern refers to a beam shape provided by the beamforming scheme. The beam pattern may be a propagation area of a beam formed by the beamforming scheme, and may be referred to as beam coverage. The base station 110 may provide the beam pattern 530 via an MMU. The base station 110 may provide the beam pattern 530 by applying beamforming parameters appropriate for respective paths to which a plurality of antenna elements is connected included in the MMU. For example, the base station 110 may apply a complex weight to an analog signal via a phase shifter and a power amplifier of each RF path. The base station 110 may provide the beam pattern 530 by emitting a signal to which a complex weight is applied, via each antenna element.

If at least one RF path of a plurality of RF paths operates abnormally, in other words, if it is difficult to assign a complex weight, which the corresponding RF path requires in order to provide the beam pattern 530, beam distortion may occur. The beam pattern 530 may be formed based on the phase and power of each of the antenna elements of an antenna array. If an RF path connected to an antenna element does not assign a phase value or a power value appropriate for a signal, the shape of a beam emitted from the corresponding antenna element may be distorted. That is, beam distortion may occur. If the quality of a signal (e.g., SINR) emitted from an antenna element becomes low, beam distortion may occur. The RF path may correspond to the RF path described with reference to FIGS. 4A to 4C.

A description will be provided under the assumption that at least one RF path of the multiple RF paths that form the beam pattern 530 operates abnormally. The base station 110 may form a beam pattern 540, as opposed to the beam pattern 530. The base station 110 may assign an appropriate phase value and power value to a signal in each RF path in order to form the beam pattern 530, but some RF paths malfunction, and thus the beam pattern 540 may be formed.

As illustrated in FIG. 5, coverage may change due to the distorted beam pattern 540. In order to form a beam pattern, each RF path may be configured to perform signal processing according to settings. In this instance, if a signal-processing result according to the settings is not obtained, it is determined that the RF path is defective. For example, the base station 110 may transmit system information for all terminals (e.g., terminals 120-1, 120-2, 120-3, and 120-4) within a cell. The base station 110 may control a beamforming module (e.g., an MMU or the analog beamforming unit 408 of FIG. 4A) to apply beamforming parameters related to the beam pattern 530, in order to apply the beam pattern 530. However, if, for example, at least one RF path is disconnected and a signal is not transmitted normally, coverage may be decreased. Due to the decrease in coverage, the number of terminals that are serviced may also decrease. Due to failure of operation of some RF paths, the base station 110 may form the beam pattern 540 as opposed to the beam pattern 530. Accordingly, a terminal that is not serviced, such as the terminal 120-1, may be present. The terminal 120-1 may perform handover, or may be in the state of being isolated. The service disconnection may cause deterioration in the quality of communication.

To overcome a decrease in coverage caused by beam distortion, there is a desire for a method of solving beam distortion. For example, an equipment engineer may directly change an RF path that has a problem so as to overcome beam distortion. However, an action such as direct changing cannot always be performed. The action may not be immediately performed, or may be inefficient in terms of cost. Therefore, there may be provided a scheme of providing coverage which is substantially the same as, or similar to, an existing beam pattern, based on remaining RF paths (that is, available RF paths), using an apparatus (e.g., an RU of the base station) that forms a beam pattern, or the apparatus and network entities connected to the apparatus.

Hereinafter, an apparatus that provides beam coverage is referred to as a communication node in the description. The communication node is a part of a radio access network, such as a base station, a DU, an AU, an MMU, a TRP, and the like, and may refer to an apparatus related to operations for generating a wireless signal via beamforming. The communication node may obtain parameter values appropriate for respective RF paths in order to form a desired beam pattern. According to some embodiments, the communication node may directly obtain parameter values by performing operations. However, the amount of operations needed may increase exponentially when the number of RF paths increases, and the operations may be burdensome for the communication node to perform by itself. Therefore, according to some other embodiments, a network entity connected to the communication node may assist in performing operations.

Hereinafter, terms needed to describe a scheme of providing coverage which is substantially the same as, or similar to, that of an existing beam pattern, based on operable RF paths, that is, terms needed to describe a beam pattern recovery procedure according to various embodiments, will be defined.

A "beam pattern" refers to a beam shape. The beam pattern refers to the shape of coverage of a signal transmitted via emission by an antenna in a real space, that is, in three dimensions. A plurality of antennas illustrated in the disclosure may form a composite beam pattern by combining the radiated power of each antenna. The beam pattern according to various embodiments may be referred to as a "composite beam pattern." In order to define the beam pattern, that is, the beam shape, various indices (metrics), such as a half-power beam width (HPBW), the gain of a main lobe, the gain of a main lobe compared to the gain of a side lobe, and the like, may be used.

"Beamforming parameter" refers to a parameter used to form a beam. The beamforming parameter may be an adjustable parameter, and may be a parameter that affects a beam shape. For example, the beamforming parameter may be a phase value to be applied to a phase shifter of an RF path. Signals emitted from respective antenna elements may go through different wireless channels due to the structure of antenna elements, which are spatially separated. Therefore, a phase is shifted in advance in order to prevent the phase from being shifted when each signal is received, and coverage in which a signal is actually transmitted may be changed. Phase shifting in the frequency domain may correspond to cyclic shifting in the time domain. Also, for example, the beamforming parameter may be a power value that is applied to an amplifier in an RF path. A high power may enable a signal to travel further, and may cause an increase in coverage.

An RF path may be the minimum unit path that controls the size and the phase of a signal emitted from an antenna element. In order to restore the coverage of a beam pattern, an element in which a problem occurs among the elements that form the beam pattern needs to be identified, and a unit needs to be defined to specify the severity of the problem. For example, when the number of antenna elements connected to a single phase shifter is two, the number of RF paths may be one. However, the definition is merely provided for describing various embodiments, and the various embodiments are not limited thereto. Therefore, according to an embodiment, when the number of antenna elements connected to a single phase shifter is two, the number of RF paths may be two.

"Path failure" refers to the situation in which at least one of the components of an RF path or components connected to the RF path operates abnormally, that is, the situation in which at least one thereof is out of order. "Path failure" may be referred to as RF path failure. That is, "path failure" may refer to the situation in which the phase and power applied to a signal that passes through an RF path are different from designated values. For example, if a phase shifter is out of order, an RF path failure may occur in an RF path that includes the phase shifter. For example, if an amplifier is out of order, an RF path failure may occur in an RF path that includes the amplifier. For example, if a transceiver unit (TXRU) is out of order, an RF path failure may occur in each of the RF paths connected to the TXRU. For example, if an up-converter is out of order, an RF path failure may occur in each of the RF paths connected to the up-converter. For example, if an antenna element is out of order, an RF path failure may occur in each of the RF paths connected to the antenna element. For example, if a coupler is out of order, an RF path failure may occur in each of the RF paths that is connected to the coupler. For example, in the case in which the phase shifter is out of order, when another element connected to the phase shifter is also out of order, an antenna element connected to the corresponding phase shifter is already incapable of emitting a signal in the original form, and thus only a single RF path failure may be recognized.

"Beam pattern recovery" refers to a procedure for compensating for beam distortion incurred by RF path failure. Beam pattern recovery is a procedure of forming a beam pattern in order to provide coverage substantially the same as, or similar to, that of an existing beam pattern, that is, the beam pattern that would be formed if path failure had not occurred. The beam pattern may be generated using RF paths (hereinafter, "available RF paths"), excluding an RF path in which an RF path failure occurs (hereinafter, "failed RF path"). A beamforming unit according to various embodiments may regenerate a beam pattern by itself so as to maintain coverage similar to the existing coverage/output of a common beam using remaining available RF paths.

The beam pattern recovery may be different from a procedure of discovering another beam or a procedure of determining a prepared beam to be a new serving beam when a communication problem (e.g., radio link failure (RLF)) is caused in a serving beam identified via beam sweeping among a plurality of beams. That is, a beam pattern recovered according to various embodiments is a beam pattern that is newly generated due to an internal problem with the apparatus (e.g., an MMU) that forms a beam pattern, as opposed to a beam pattern that is newly formed due to deterioration in the state of a wireless channel.

Figure 6:
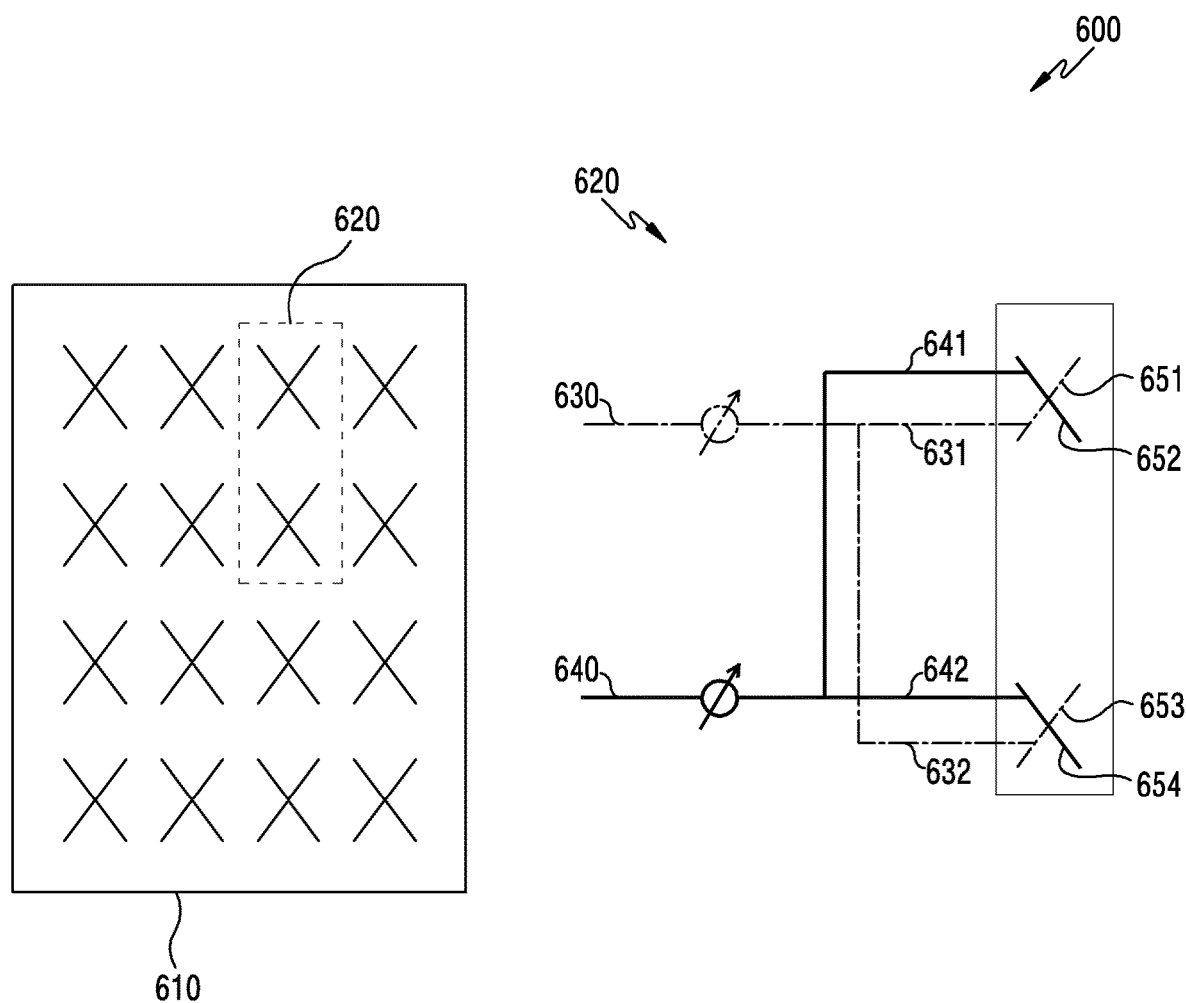
FIG. 6 is a diagram illustrating an example of a path failure in a wireless communication system according to an embodiment of the disclosure.

FIG. 6 is a diagram illustrating an example 600 of an RF path failure in a wireless communication system according to an embodiment of the disclosure.

FIG. 6 illustrates an example of the situation in which an RF path failure occurs in a cross-polarization (cross-pol) (or X-pol) antenna that provides V-polarization and H-polarization. However, the descriptions may be equally or similarly applicable to another antenna.

Referring to FIG. 6, a communication node may include an antenna array 610. The antenna array 610 may be an antenna array having a 4×4 structure. The antenna array 610 may include sub-arrays. A sub-array may include one or more elements. For example, the antenna array 610 may include a sub-array 620.

The sub-array 620 may include four antenna elements. The sub-array 620 may include a first antenna element 651, a second antenna element 652, a third antenna element 653, and a fourth antenna element 654. The first antenna element 651 may be connected to a first antenna path 631. The second antenna element 652 may be connected to a second antenna path 641. The third antenna element 653 may be connected to a third antenna path 632. The fourth antenna element 654 may be connected to a fourth antenna path 642. A first RF path 630 may be connected to the first antenna path 631 and the third antenna path 632. A second RF path 640 may be connected to the second antenna path 641 and the fourth antenna path 642. The first RF path 630 and the second RF path 640 may be connected to a single TXRU (e.g., an RF chain) (not illustrated).

If at least one of the elements connected to an RF path operates abnormally, that is, is out of order, an RF path failure may occur. For example, if the sub-array 620 is out of order, an RF path failure may occur in two RF paths connected to the sub-array 620. As another example, if the third antenna path 632 is disconnected, an RF path failure may occur in the first RF path 630 connected to the third antenna path 632. As another example, if a single TXRU is out of order, an RF path failure may occur in two RF paths. According to an embodiment, unlike the above description, the unit in which a path failure occurs may be defined as an individual antenna path, as opposed to an RF path.

Although FIG. 6 provides the description in terms of antenna elements configured for cross-polarization, the description associated with an RF path, an RF path failure, a sub-array, and a TXRU may be equivalently applied to antenna elements configured for co-polarization (or single polarization).

Situations and terms assumed to describe beam pattern recovery according to various embodiments have been described with reference to FIGS. 1 to 6. Hereinafter, as a preprocess of a beam pattern recovery, a procedure of detecting an RF path failure will be described with reference to FIGS. 7 to 8B.

Figure 7:
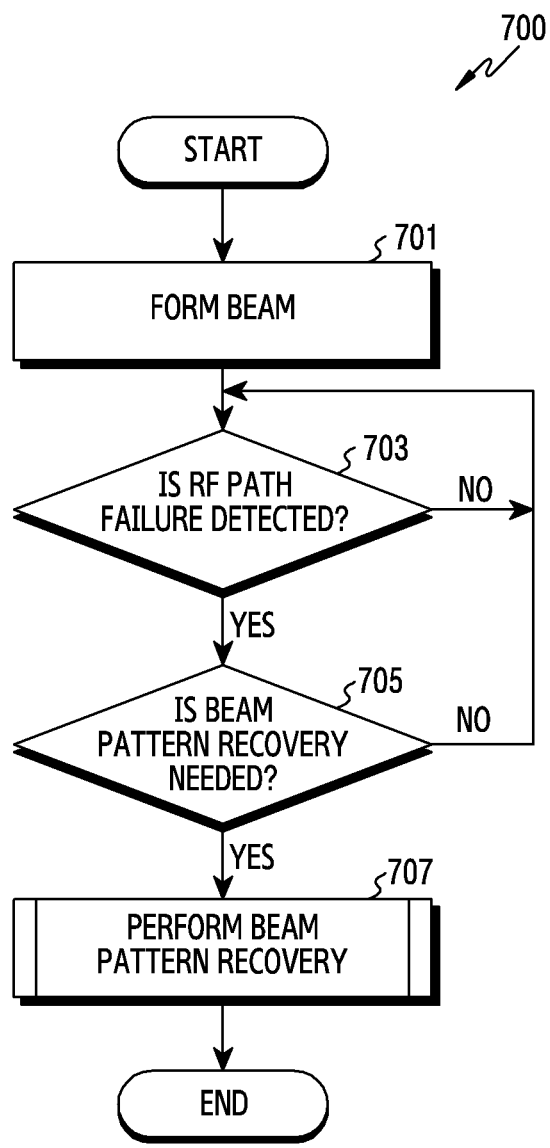
FIG. 7 is a flowchart illustrating the operation of a communication node for managing a wireless environment in a wireless communication system according to an embodiment of the disclosure.

FIG. 7 is a flowchart 700 illustrating the operation of a communication node for beamforming management in a wireless communication system according to an embodiment of the disclosure.

The communication node may be the base station 110 of FIG. 1. Beamforming management may include a procedure of identifying whether each component that forms a beam pattern operates normally, and a procedure of solving a problem if a component operates abnormally, in order to form a desired beam pattern.

Referring to FIG. 7, in operation 701, the communication node may form a beam. The communication node may form a beam pattern. The communication node may identify a beamforming parameter in order to form a predetermined beam pattern. The communication node may apply the identified beamforming parameter (e.g., a phase shift value or a power value) to each component. For example, the communication node may apply a phase value, corresponding to the predetermined beam pattern, to a phase shifter of each RF path. Even though a signal of each antenna element goes through a different wireless channel, coverage corresponding to the predetermined beam pattern may be formed by shifting the phase of each of the antenna elements, which are spatially separated. For example, the communication node may apply an assigned power value to an amplifier of each RF path. The beam pattern in operation 701 is a beam pattern obtained based on beamforming parameter values set before an RF path failure is detected, and may be referred to as a default beam pattern.

In operation 703, the communication node may detect whether an RF path failure occurs. The communication node may monitor each RF path. The communication node may monitor each component of an RF path. For example, the communication node may monitor whether a phase shifter operates normally. As another example, the communication node may monitor whether a power amplifier operates normally.

According to an embodiment, an alarm or a notification may be set to be generated if an operation state of each component changes. In this instance, the communication node may identify whether an RF path failure occurs, based on an alarm or a notification caused by a change in an operation state.

According to an embodiment, the communication node may identify an index indicating the performance of each element, each RF path, or each antenna so as to identify whether an RF path failure occurs. For example, the communication node may identify whether an RF path failure occurs based on the output of a voltage standing wave ratio (VSWR) or a standing wave ratio (SWR). For example, the communication node may identify whether an RF path failure occurs based on a return loss and a return coefficient of an RF path and an antenna end. For example, the communication node may identify whether an RF path failure occurs based on the gain of an amplifier, the gain of an antenna, or an S parameter.

According to an embodiment, the communication node may perform a test procedure in order to identify whether each element operates normally. The test procedure refers to a procedure of identifying whether a desired output value based on an input value is provided. If requirements (e.g., the range of an output value or the range of an error) are found not to be satisfied via the test procedure, the communication node determines that the corresponding element is defective.

The communication node may continuously monitor the state of a beamforming component, that is, the state of an MMU. The communication node may detect whether an RF path failure occurs. The communication node may determine whether a component malfunctions. If an RF path failure occurs, the communication node may proceed with operation 705. If an RF path failure does not occur, the communication node may continue to monitor for the occurrence of an RF path failure again. According to an embodiment, the procedure of detecting an RF path failure in operation 703 may be periodically performed. The example of the RF path failure detection procedure will be described with reference to FIG. 8A. According to an embodiment, the RF path failure detection procedure in operation 703 may be aperiodically performed. The example of the RF path failure detection procedure will be described with reference to FIG. 8B. The two above-described examples may be combined and performed in parallel. Unlike FIG. 7, according to some embodiments, if an RF path failure does not occur, the communication node may terminate a beamforming management procedure.

In operation 705, the communication node may determine whether beam pattern recovery is needed. If the RF path failure is detected, a beam shape based on the default beam pattern may be different from a desired beam shape. Therefore, the communication node may determine whether to recover the beam pattern.

According to various embodiments, although an RF path failure occurs, if the resultant damage is slight, the communication node may not perform beam pattern recovery. According to some embodiments, if the number of RF paths in which an RF path failure occurs is less than or equal to a threshold value, the communication node may determine that beam pattern recovery is not needed. For example, the threshold value may be determined based on at least one of a service provided by the communication node, the absolute magnitude of coverage required by the communication node, the number of antennas (antenna elements) included in an MMU of the communication node, and the type of antenna (e.g., cross-polarization or co-polarization). As another example, the threshold value may be a designated value (e.g., one).

According to various embodiments, although an RF path failure occurs, if beam pattern recovery is insufficient for compensating for the distortion of a beam pattern, the communication node may not perform beam pattern recovery. With only a beam pattern obtained using available RF paths, it may be difficult to obtain performance similar to that of an original beam pattern, that is, the beam pattern in operation 701 (that is, the default beam pattern). In addition, if recovering a beam pattern is difficult, the communication node according to various embodiments may display a notification reporting the same. The notification may be a message indicating that replacement or maintenance of an RF path or an element of the RF path is required. According to some embodiments, if the number of RF paths in which an RF path failure occurs is greater than or equal to a threshold value, the communication node may determine that beam pattern recovery is not needed. For example, the threshold value may be determined based on at least one of the service provided by the communication node, the absolute magnitude of coverage required by the communication node, the number of antennas (antenna elements) included in an MMU of the communication node, and the type of antenna (e.g., cross-polarization or co-polarization). As another example, the threshold value may be a designated value depending on the total number of antennas (31 antennas out of the total of 32 antennas or 16 antennas out of the total of 32 antennas). In other words, the designated value may be determined based on the degree of recovery of a distorted beam pattern that may be obtained via beam pattern recovery by an MMU apparatus.

The communication node may determine whether a component malfunctions, and may request to perform recovery if needed. If the communication node determines that beam pattern recovery is needed, the communication node may proceed with operation 707. If the communication node determines that beam pattern recovery is not needed, the communication node may proceed with operation 703 again. That is, the communication node may monitor whether RF path failure occurs again. Unlike FIG. 7, an operation of determining whether to perform a beam pattern recovery and terminating a beamforming management procedure without performing beam pattern recovery may also be understood as one of the embodiments.

In operation 707, the communication node may perform beam pattern recovery. The example of operation 707 will be described with reference to FIGS. 9 to 13. Although FIG. 7 illustrates that the beamforming management procedure is terminated after operation 707 is performed, RF path failure may be continuously monitored even though a beam pattern is recovered. According to various embodiments, the communication node may perform operation 703 again after performing operation 707.

Although FIG. 7 describes that a beam is formed before an RF path failure is detected, this refers to an operation of forming a normal beam pattern, and does not mean that operation 701 is necessarily performed in order to perform operation 703. An operation of forming a beam pattern of a desired shape by performing each operation from operation 703 may also be understood as one of the embodiments. For example, if a problem occurred in an RF path before installation, the communication node may form a desired beam pattern or a beam pattern that includes an area desired to be covered via simulation or the like using available RF paths.

Although FIG. 7 illustrates that beam pattern recovery is performed if an RF path failure occurs, the embodiments are not limited thereto. The communication node according to various embodiments may perform only operation 707. According to some embodiments, if a request for changing the existing beam pattern generated in operation 701 is present, the communication node may perform beam pattern recovery. For example, if the physical direction is physically controlled by tilting antennas of the active antenna array, the communication node may generate a beam pattern. The communication node may form a new beam pattern based on physical direction value information. For example, if an antenna tilt is lowered vertically by 15 degrees, the communication node may generate a new beam pattern in order to form a beam pattern that is tilted at least 15 degrees in the vertical direction, compared to the existing beam pattern. According to some other embodiments, the communication node may perform beam pattern recovery in response to a designated command, without determining whether an RF path failure occurs. For example, the designated command may be an input that is manually delivered when an operator previously recognizes that an RF path is out of order. The communication node may perform beam pattern recovery in order to form a composite beam pattern corresponding to the set requirements (e.g., a beam width, a direction, the size of a main lobe, or the like) of a beam pattern.

Although FIG. 7 illustrates that operation 705 of determining whether beam pattern recovery is needed is performed, the various embodiments are not limited thereto. An operation of performing beam pattern recovery when an RF path failure is detected, without performing operation 705, may also be understood as one of the embodiments.

According to an embodiment, based on the detecting of the path failure, the communication node determines that beam pattern recovery is needed.

In some embodiments, the communication node further comprises detecting whether a monitoring period has arrived; and in response to detecting that the monitoring period has arrived, determines a state of an RF path of the plurality of RF paths.

In some embodiments, the communication node determines a state of each RF path of the plurality of RF paths.

In some embodiments, a different monitoring period is independently set for each RF path of the plurality of RF paths.

In some embodiments, the monitoring period is set independently for each beamforming component of the plurality of RF paths.

In some embodiments, the communication node determines the monitoring period based on at least one of a geographical area to cover, a cell capacity, a frequency of access by a terminal, a number of terminals that perform access, or a physical location relationship with a base station.

In some embodiments, the communication node detects an event. In response to detecting the event, the communication node identifies an operation state of an RF path. The communication node detects the RF path failure based on detecting a change greater than or equal to a threshold value in the operation state.

Figure 8A:
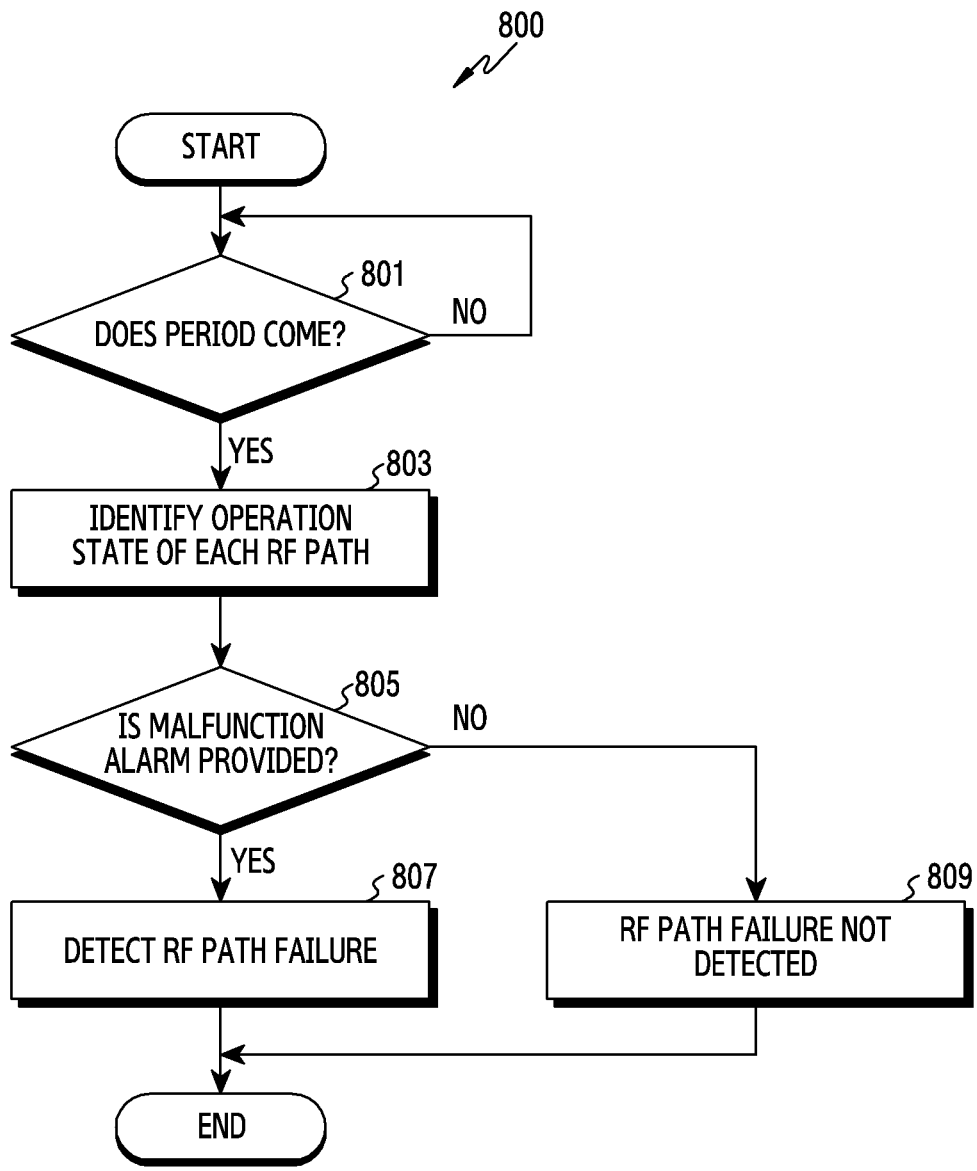
FIG. 8A is a flowchart illustrating the operation of a communication node for detecting a path failure in a wireless communication system according to an embodiment of the disclosure.

FIG. 8A is a flowchart 800 illustrating the operation of a communication node for detecting path failure in a wireless communication system according to an embodiment of the disclosure.

FIG. 8A is a part of operation 703 of FIG. 7, and it is understood that the operation of FIG. 8A is performed by the communication node or a component of the communication node. The communication node may be the base station 110 or the terminal 120 (e.g., one of the terminals 120-1, 120-2, 120-3, and 120-4) of FIG. 1.

Referring to FIG. 8A, in operation 801, the communication node may detect whether a monitoring period has arrived. The monitoring period may be a period for determining the state of each RF path. According to some embodiments, the monitoring period may be a period for determining the operation states of all RF paths. According to some embodiments, the monitoring period may be a period for determining the operation state of a predetermined RF path. The monitoring period may be independently (or differently) set for each RF path. According to some other embodiments, the monitoring period may be set for each beamforming component (e.g., a TXRU, a power amplifier, an RF chain, a phase shifter, an antenna array, a sub-array, and an antenna element) of all RF paths. For example, the monitoring period for phase shifters and the monitoring period for sub-arrays may be set independently.

The monitoring period according to various embodiments may be set variously. The monitoring period may be determined based on at least one of a geographical area to cover, a cell capacity, a frequency of access by a terminal, the number of terminals that perform access, and the physical location relationship with another base station. According to some embodiments, the monitoring period may be a designated value. For example, the monitoring period may be set to a default value according to the policy of the operator that manages the communication node. According to some other embodiments, the monitoring period may be received from a server. The server may provide a monitoring period value to the communication node, if needed. The server may be a management server of the operator that manages the communication node.

In operation 803, the communication node may identify the operation state of each RF path. The communication node may identify the operation state of an RF path, an element (e.g., a phase shifter) of an RF path, or an element (e.g., an antenna element or an RFIC) connected to an RF path. Identifying the operation state refers to identifying whether a path failure occurs.

In operation 805, the communication node may identify whether a malfunction alarm has been raised. The malfunction may include an operation associated with at least one of the situation in which an element among the circuits of an RF path is defective, the situation in which an electric wire of a circuit is disconnected, and the situation in which an RF path fails to satisfy a required performance index since a connection between elements is defective. The communication node may identify whether an alarm caused by a malfunction has been raised. If the malfunction alarm has been raised, the communication node may proceed with operation 807. If the malfunction alarm has not been raised, the communication node may proceed with operation 809.

In operation 807, the communication node may determine that occurrence of an RF path failure is detected. According to an embodiment, the communication node may proceed with operation 705 according to the flowchart of FIG. 7. According to another embodiment, the communication node may proceed with operation 707, without performing operation 705.

In operation 809, the communication node may determine that an RF path failure does not occur. According to an embodiment, the communication node may proceed with operation 703 according to the flowchart of FIG. 7. According to another embodiment, the communication node may terminate a beamforming management procedure.

Figure 8B:
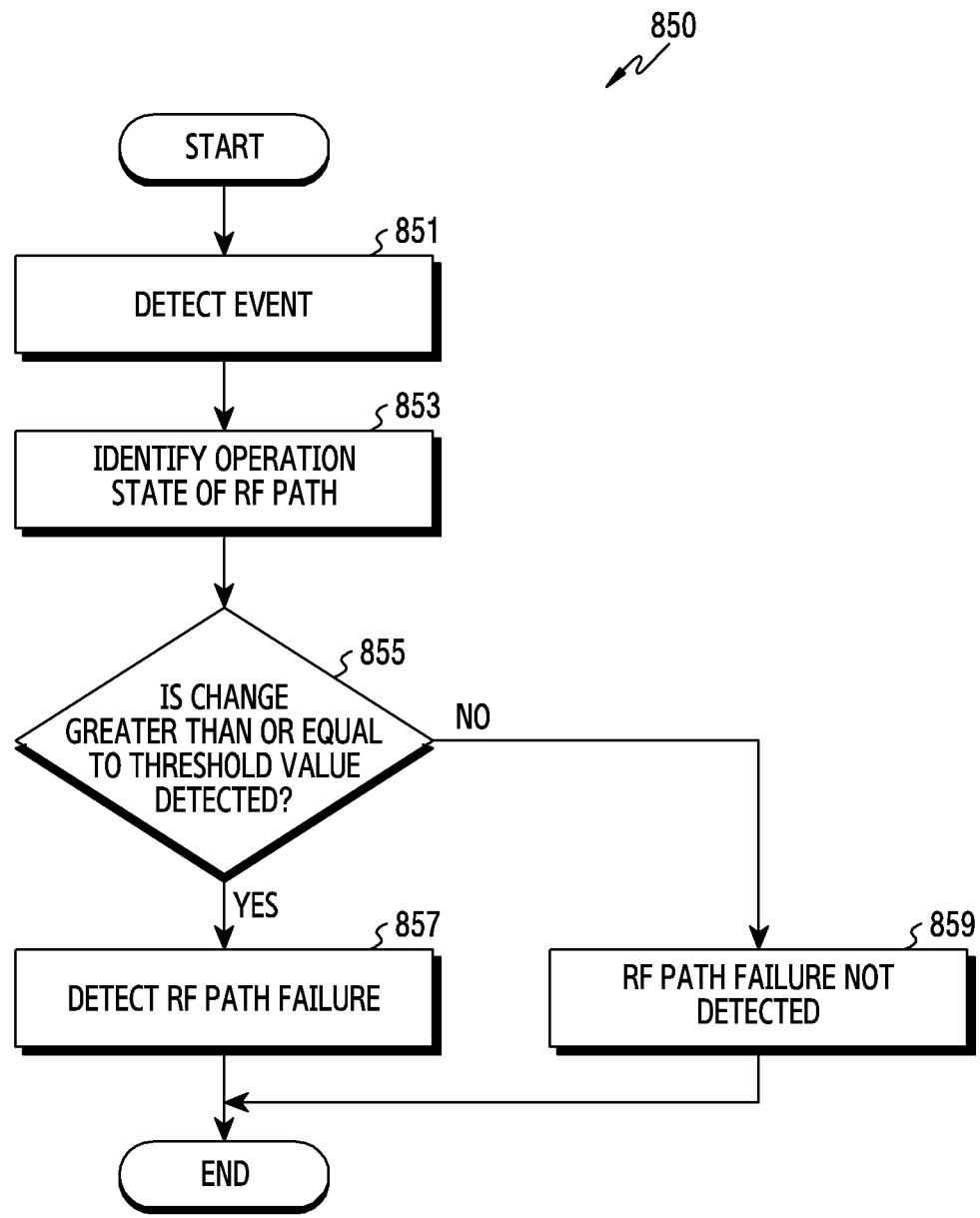
FIG. 8B is a flowchart illustrating the operation of a communication node for detecting a path failure in a wireless communication system according to an embodiment of the disclosure.

FIG. 8B is a flowchart 850 illustrating the operation of a communication node for detecting a path failure in a wireless communication system according to an embodiment of the disclosure.

FIG. 8B is a part of operation 703 of FIG. 7, and it is to be understood that the operation of FIG. 8B is performed by the communication node or a component of the communication node. The communication node may be the base station 110 or the terminal 120 of FIG. 1.

In operation 851, the communication node may detect an event. Here, the event may be an event that triggers identification of whether an RF path failure occurs. According to some embodiments, the event may include the situation in which a communication disconnection (e.g., an RLF) occurs in a beam pattern at least a predetermined number of times or for at least a predetermined period of time. A continuous communication disconnection in a predetermined beam pattern may imply the possibility of a problem in the physical apparatus that forms the corresponding beam pattern.

According to some other embodiments, the event may include the situation in which the frequency of access in a predetermined area (e.g., a tracking area or a ran area) does not exist for at least a predetermined period of time. For example, a core network may detect the movement of terminals via an area update procedure. If access does not occur in a predetermined area, there may be the possibility of a beam distortion. The core network may report an event to the communication node. As another example, the communication node may directly detect the occurrence of the event.

According to some other embodiments, the event may be reception of an on-demand message transmitted from the server. For example, an operator may identify the performance of a base station via the server, if needed. The management server of the operator may transmit an event that requires monitoring of an RF path, to the base station.

In operation 853, the communication node may identify the operation state of an RF path. According to some embodiments, the communication node may identify the operation states of all RF paths. For example, if an RLF occurs continuously, the communication node may identify the operation states of all RF paths in order to identify a defective RF path. According to some embodiments, the communication node may identify the operation state of an RF path related to the event. For example, a message transmitted from the server may include information associated with an RF path of which the operation state needs to be identified. For example, the message transmitted from the server may include information associated with a predetermined element (e.g., a phase shifter) of which the operation state needs to be identified. Operation 853 corresponds to operation 803, and thus a detailed description of operation 853 may be at least partially omitted.

In operation 855, the communication node may identify whether a change greater than or equal to a threshold value is detected. The communication node may identify whether the operation state of an RF path or the operation state of a circuit or an element included in an RF path changes by at least a threshold value, compared to a normal state. The normal state refers to the state in which the performance index that an RF path requires is satisfied. For example, if parameters for an RF path fall within a designed value range, the RF path may be in the normal state. For example, if the occurrence of an RF path failure was not detected when the operation state of the RF path was identified in advance, a previously identified parameter value may be a parameter value in the normal state. If a change greater than the threshold value is detected, the communication node may proceed with operation 857. If a change greater than the threshold value is not detected, the communication node may proceed with operation 859.

In operation 857, the communication node may determine that the occurrence of an RF path failure is detected. According to an embodiment, the communication node may proceed with operation 705 according to the flowchart of FIG. 7. According to another embodiment, the communication node may proceed with operation 707, without performing operation 705.

In operation 859, the communication node may determine that an RF path failure does not occur. According to an embodiment, the communication node may proceed with operation 703 according to the flowchart of FIG. 7. According to another embodiment, the communication node may terminate a beamforming management procedure.

Figure 9:
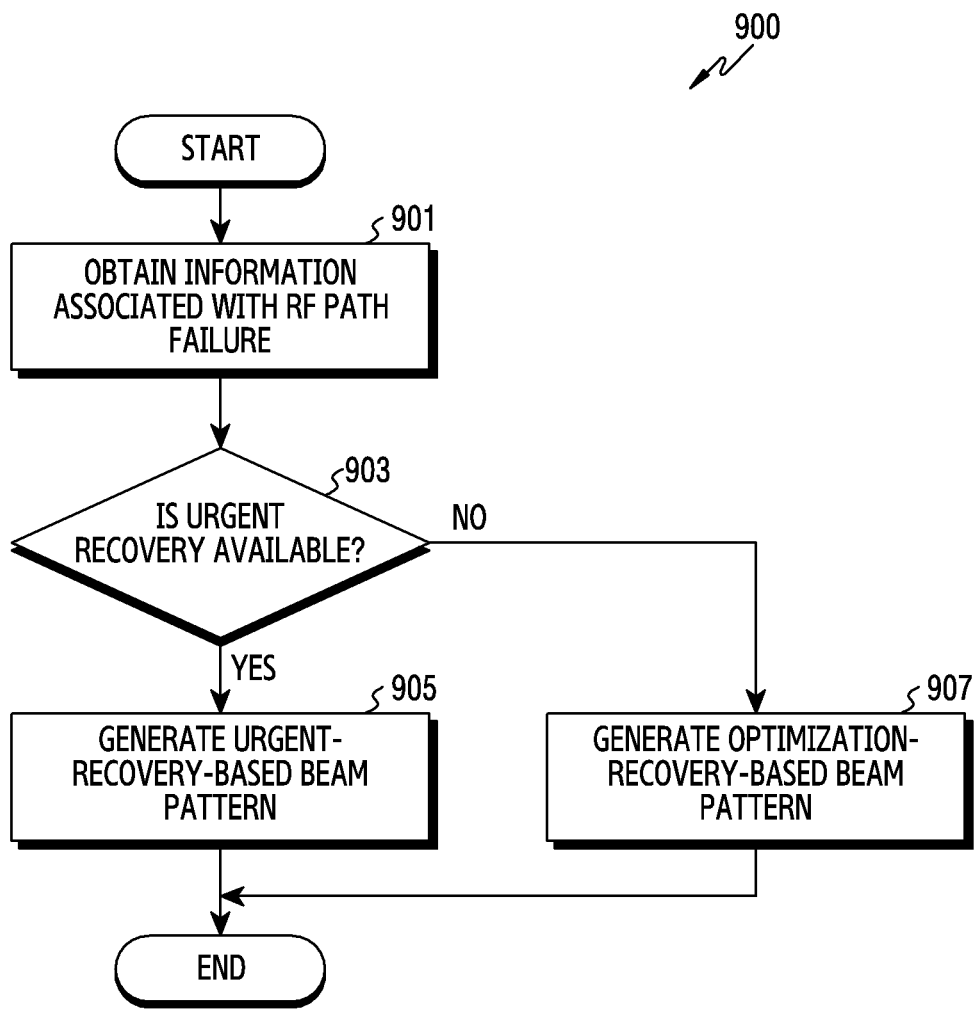
FIG. 9 is a flowchart illustrating the operation of a communication node for recovering a beam pattern in a wireless communication system according to an embodiment of the disclosure.

FIG. 9 is a flowchart 900 illustrating the operation of a communication node for recovering a beam pattern in a wireless communication system according to an embodiment of the disclosure.

FIG. 9 is a part of operation 707 of FIG. 7, and it is understood that the operation of FIG. 9 is performed by the communication node or a component of the communication node. The communication node may be the base station 110 or the terminal 120 of FIG. 1.

Referring to FIG. 9, in operation 901, the communication node may obtain information associated with an RF path failure. The information associated with an RF path failure may include at least one piece of information among information associated with an RF path in which the RF path failure occurs, information associated with the element that caused the RF path failure, information associated with RF paths in which the RF path failure occurs, that is, the number of failed RF paths, and information associated with a power value allocated to the failed RF path.

In operation 903, the communication node may determine whether urgent recovery is available. The communication node may determine whether urgent recovery is available based on the information associated with the RF path failure. According to some embodiments, the communication node may determine whether urgent recovery is available based on the number of failed RF paths. For example, if the number of failed RF paths is less than or equal to two, the communication node may determine to perform urgent recovery. If the number of failed RF paths is small, the number of combinable embodiments in order to compensate for the failed RF paths may be decreased. The amount of operations to be performed for compensating for the failed RF paths is small, and thus, the communication node may determine to perform urgent recovery by taking action itself. According to some embodiments, the communication node may determine whether urgent recovery is available based on a power parameter. The communication node may identify the power parameter so as to determine whether power boosting is available. There may be total power allocated to the communication node and power allocated for each RF path. When a path failure occurs in an RF path, a power loss corresponding to the failed RF path may occur in the sum of power transmitted via all of the RF paths. If an RF path has a power margin, the communication node may perform power boosting based on the margin in order to compensate for the power loss.

If urgent recovery is available, the communication node may proceed with operation 905. If urgent recovery is not available, the communication node may proceed with operation 907.

In operation 905, the communication node may generate an urgent-recovery-based beam pattern. The urgent-recovery-based beam pattern is a beam pattern generated via a compensation procedure performed by the communication node itself (the base station 110 of FIG. 1) or an apparatus (e.g., a gNB if the communication node is a TRP) connected to the communication node. Parameters for a beam pattern for compensating for the RF path failure may be obtained promptly, and thus beam recovery may be performed promptly.

In operation 907, the communication node may generate an optimization-recovery-based beam pattern. The optimization-recovery-based beam pattern refers to a beam pattern generated based on parameters obtained via an optimization operation. For example, the optimization operation may be performed by a remote server. The server may identify the beam pattern for providing performance and coverage that is the most similar to an existing beam pattern, among generable beam patterns, by adjusting a parameter associated with the failed RF path and adjustable parameters of available RF paths. The server may transfer parameter information corresponding to the identified beam pattern to the communication node. The communication node may perform beam recovery by applying the beam pattern corresponding to the parameter information.

Although it has been described that the optimization operation is performed by the server in operation 907, the communication node may directly calculate the optimization operation according to an embodiment. An operation module for performing the optimization operation may be implemented in the communication node.

Unlike the example illustrated in FIG. 9, although urgent recovery is available, the communication node may generate an optimization-recovery-based beam pattern according to a designated condition, which may also be understood as one of the embodiments.

Figure 10:
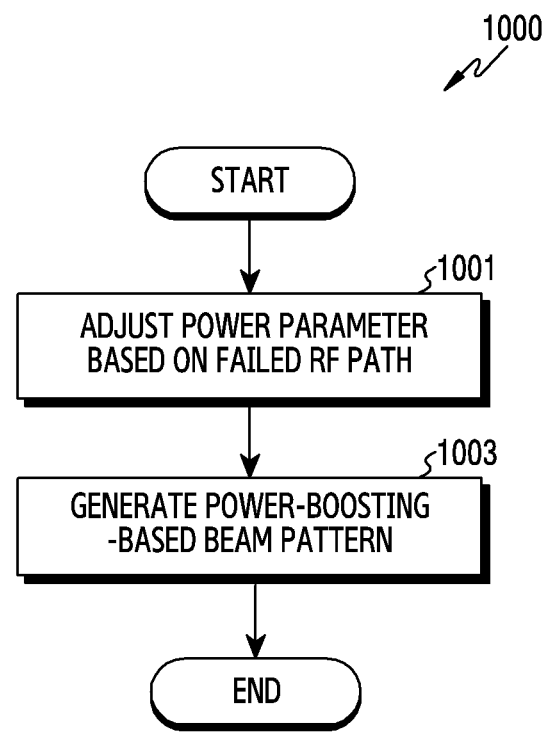
FIG. 10 is a flowchart illustrating the operation of a communication node for performing urgent recovery in a wireless communication system according to an embodiment of the disclosure.

FIG. 10 is a flowchart 1000 illustrating the operation of a communication node for performing urgent recovery in a wireless communication system according to an embodiment of the disclosure.

FIG. 10 is a part of operation 905 of FIG. 9, and it is to be understood that the operation of FIG. 10 is performed by the communication node or a component of the communication node. The communication node may be the base station 110 or the terminal 120 of FIG. 1.

Referring to FIG. 10, in operation 1001, the communication node may adjust a power parameter based on a failed RF path.

The communication node may perform power boosting based on the failed RF path in order to maintain the total output power within the maximum power margin available for a power amplifier. The communication node may adjust the power parameter of each power amplifier for power boosting. Particularly, the communication node may identify the available maximum power. The communication node may determine a power margin based on the failed RF path. The communication node may perform power boosting based on the number of failed RF paths. The communication node may perform power boosting based on the power margin. For example, the communication node may identify the available maximum power as 100 W. The communication node may include 100 RF paths. If power is evenly allocated to each RF path, and if an RF path failure occurs in two RF paths, the communication node may determine that the available margin of power is 2 W. The communication node may perform power boosting by an amount equivalent to the power margin using power amplifiers of the remaining 98 RF paths.

According to some embodiments, the communication node may allocate the same power margin to each power amplifier. For example, the communication node may perform power boosting of each power amplifier by as much as $2/98$. According to some other embodiments, the communication node may allocate a power margin to one or more compensation RF paths. The compensation RF path may be an RF path used for performing compensation associated with the existing beam pattern via additional power boosting, among available RF paths. For example, the communication node may identify a compensation RF path, and may allocate power boosting of $2/98$ to a power amplifier corresponding to the corresponding RF path.

According to various embodiments, in order to reduce a load, the communication node may not perform power boosting even if sufficient output power is present. According to some embodiments, if the number of failed RF paths is less than or equal to a threshold value, the communication node may not perform power boosting. That is, even if sufficient output power is present, the communication node may not perform power boosting. According to an embodiment, the communication node may not perform power boosting, and may perform urgent recovery according to another scheme (e.g., urgent recovery of FIG. 11). According to another embodiment, unlike the example illustrated in FIG. 9, if the number of failed RF paths is less than or equal to a threshold value, the communication node may not perform urgent recovery. This may correspond to an operation of determining that beam pattern recovery is not needed in operation 705 of FIG. 7.

In operation 1003, the communication node may generate a power-boosting-based beam pattern. Power boosting may be performed according to the parameter adjusted in operation 1001. The communication node may generate a new beam pattern using the increased power of at least a few RF paths. The new beam pattern may provide coverage that becomes wide as the power increases compared to that of the existing beam pattern.

Figure 11:
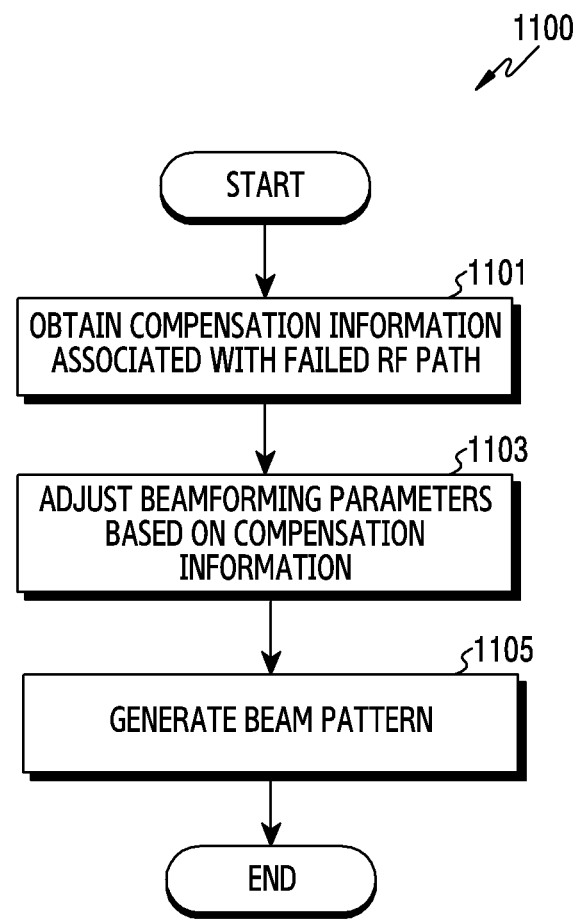
FIG. 11 is another flowchart illustrating the operation of a communication node for performing urgent recovery in a wireless communication system according to an embodiment of the disclosure.

FIG. 11 is another flowchart 1100 illustrating the operation of a communication node for performing urgent recovery in a wireless communication system according to an embodiment of the disclosure.

The communication node may be the base station 110 or the terminal 120 of FIG. 1. FIG. 11 is a part of operation 905 of FIG. 9, and it is to be understood that the operation of FIG. 11 is performed by the communication node or a component of the communication node.

Referring to FIG. 11, in operation 1101, the communication node may obtain compensation information associated with a failed RF path.

The communication node may identify a failed RF path. The communication node may obtain compensation information corresponding to the failed RF path. According to some embodiments, the communication node may obtain compensation information corresponding to the failed RF path based on a designated table. According to an embodiment, the table may be a lookup table (LUT). The LUT may define, in advance, beamforming parameters of available RF paths which are used for compensating for each failed RF path. The beamforming parameter may include at least one of a phase shift value and a power value applied to each RF path. For example, the communication node may detect that path failure occurs in two RF paths among 32 RF paths. The communication node may obtain a phase adjustment value for at least a few of the available RF paths based on the designated table. If the number of paths in which path failure occurs is small, it is easy to configure the LUT. The communication node may store the table in advance, and may generate an urgent-recovery-based beam pattern using the same. The communication node may store a table including compensation information in a storage unit (e.g., the storage unit 230 of FIG. 2).

According to some other embodiments, the communication node may obtain compensation information from beamforming parameters applied to a failed RF path. Here, the beamforming parameter may refer to a beamforming weight. The communication node may obtain beamforming parameters of another RF path to be used for complementing a partial beam pattern formed by antenna elements of the failed RF path by directly performing an operation itself, as opposed to referring to the table. The complement to the beam pattern may be based on similarity of the physical shape of a coverage area thereof. That is, similar beam patterns may mean that similar beam patterns have similar beamforming signal gain (e.g., a unit dB) at locations in three-dimensional space. The communication node may calculate compensated beamforming parameters including at least one of a phase value applied to each phase shifter, a power value applied to each power amplifier, and the like, which may enable the difference between the existing beam pattern and a compensated beam pattern to be the minimum value, and may calculate beamforming parameters (e.g., a phase shift value and a power value) for generating a compensated beam pattern that is the most similar to the existing beam pattern by applying indices which affect a physical shape, such as a beam width, a signal gain, the form of a main lobe, and the like. If the number of paths in which path failure occurs is small, the burden of calculation of operations is low. Accordingly, the communication node may generate an urgent-recovery-based beam pattern by performing operations itself.

In operation 1103, the communication node may adjust beamforming parameters. The communication node may adjust the beamforming parameters based on the compensation information. The beamforming parameters according to various embodiments may include a phase pattern. The phase pattern may refer to the distribution of phase values applied to respective phase shifters. A beam pattern may be generated by combining beams formed by antenna elements. Therefore, the communication node may determine a new phase pattern by changing or maintaining each phase value based on the compensation information. The beamforming parameters according to various embodiments may include a power pattern. The phase pattern may refer to the distribution of power values applied to respective power amplifiers. A beam pattern may be generated by combining beams formed by antenna elements. Therefore, the communication node may determine a new phase pattern by changing or maintaining each power value based on the compensation information. The beamforming parameters according to various embodiments may include both a phase pattern and a power pattern.

The communication node may adjust beamforming parameters so that a complex weight, which is based on the compensation information, is applied to a signal that goes through each RF path. The communication node may assign a required complex weight to a signal by adjusting the values of a power amplifier and a phase shifter of a corresponding RF path, that is, by adjusting the amplitude value and/or phase value.

In operation 1105, the communication node may generate a beam pattern. The communication node may generate a new beam pattern according to the beamforming parameters adjusted in operation 1103. Here, the new beam pattern may be physically similar to the existing beam pattern. "Physical similarity" may mean that the physical shape of coverage formed according to signal gain in the three-dimensional space is similar. That is, similar beam patterns may have similar beamforming signal gain (e.g., a unit dB) at locations in three-dimensional space. If beam patterns have a signal gain difference within a predetermined range at a plurality of locations, the beam patterns may be similar to each other. If two beam patterns have similar shapes but the number of RF components (e.g., at least one of the number of antenna elements, the number of sub-arrays, and the number of available RF paths) used for forming each beam pattern is different from each other, whether to perform various embodiments may be identified.

Figure 12:
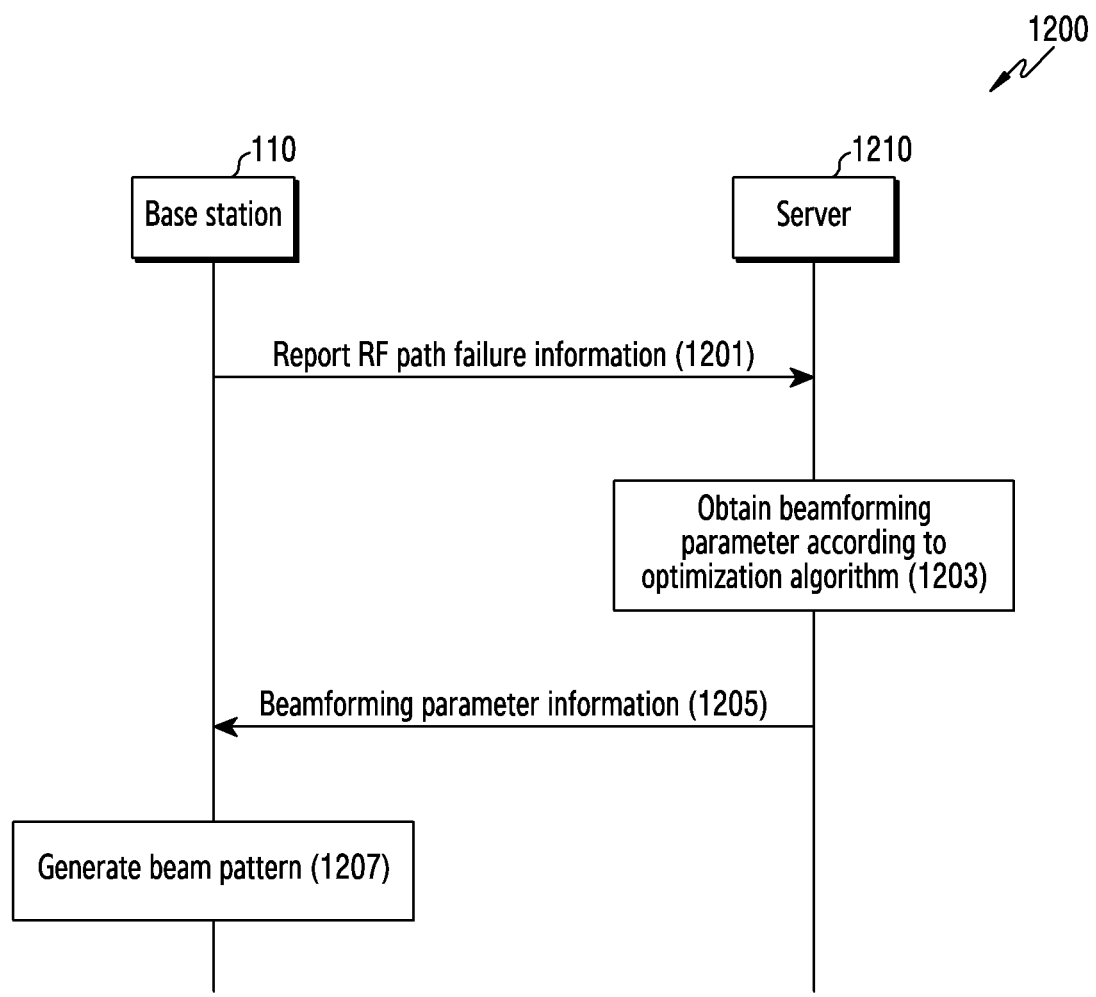
FIG. 12 is a signal flow between communication nodes for performing optimization recovery in a wireless communication system according to an embodiment of the disclosure.

FIG. 12 illustrates signal flow 1200 between communication nodes for performing optimization recovery in a wireless communication system according to an embodiment of the disclosure.

The communication nodes may be the base station 110 of FIG. 1 and a server 1210. The server 1210 may be, for example, a management server of a communication operator of the base station 110.

Referring to FIG. 12, in operation 1201, the base station 110 may report information associated with an RF path failure to the server 1210. That is, the base station 110 may transmit a report message including path failure information to the server 1210. The server 1210 may receive the report message including path failure information from the base station 110.

The report message may include information indicating that an RF path failure occurs. That is, the report message may be a message that requests a beam pattern for compensating for the RF path failure that has occurred. The server 1210 may explicitly identify information indicating the occurrence of the RF path failure, and may determine that beam pattern recovery is needed for the base station 110. Alternatively, upon reception of the report message, the server 1210 may implicitly determine that beam pattern recovery is needed for the base station 110.

The report message may include information associated with a beamforming unit. The information associated with the beamforming unit may include cell information. For example, the cell information may include at least one piece of information among the ID of each cell provided by beamforming, shape type information, the states of all paths of each cell, tilt information of an antenna array applied to a cell, half-power beam width, information associated with the number of ports of a transmitted CRS, and information associated with a synchronization signal block (SSB). The information associated with the beamforming unit may include information associated with the structure of a beamforming architecture or each component. The information associated with the beamforming unit may include information associated with power boosting. The information associated with power boosting may include at least one piece of information among information associated with whether the beamforming unit supports power boosting, the range of power boosting, and a default power margin.

The report message may include information associated with an RF path failure, that is, path failure information. According to some embodiments, the path failure information may include information associated with the path in which an RF path failure occurs, that is, information associated with a failed RF path. The information associated with a failed RF path may include at least one piece of information among information indicating a failed RF path, a phase shift value or power value applied to a failed RF path, the antenna element numbers of the antenna elements or the index of a sub-array that is connected to a failed RF path, an RF chain connected to a failed RF path, and the number of failed RF paths.

According to some embodiments, the path failure information may include information associated with a path in which an RF path failure does not occur, that is, information associated with an available RF path. The information associated with an available RF path may include at least one piece of information among information indicating an available RF path, a phase shift value or power value applied to each available RF path, the antenna element numbers of the antenna elements or the index of a sub-array that is connected to an available RF path, an RF chain connected to an available RF path, and the number of available RF paths.

According to some embodiments, the path failure information may include control information associated with an RF element. Each RF path may include RF elements that satisfy different requirements from each other. Here, the reported RF element may be an element of which a parameter value for beam pattern recovery is variable beyond a predetermined range, among the elements of an available RF path. The control information may include identification information of an element (e.g., a phase shifter located in a predetermined RF path) and the operation range of an element.

In operation 1203, the server 1210 may obtain a beamforming parameter according to an optimization algorithm. The server 1210 may obtain a beamforming parameter according to an optimization algorithm based on failure information.

In order to perform the optimization algorithm, the server 1210 may determine a plurality of candidate combinations based on the failure information or existing information associated with the base station 110 (e.g., installation information or MMU information). The server 1210 may determine the plurality of candidate combinations by making combinations of all available parameter values of each element of the available RF paths. Here, the optimization algorithm refers to a scheme of comparing all possible candidate combinations so as to obtain the combination that is the most appropriate for a required condition. For example, if M candidate combinations are present, the server 1210 may compare an existing beam pattern with the beam pattern of each of the M candidate combinations, and may identify the beam pattern determined to be the most similar beam pattern. A criterion (e.g., cost-function) for determining similarity may be set differently depending on the embodiment.

Although it is described that candidate combinations are made to include all cases, the server 1210 may determine a plurality of candidate combination by preferentially excluding, in advance, combinations corresponding to parameter values that do not comply with a predetermined condition according to an embodiment. By reducing the amount of unnecessary operations, the amount of operations to be performed by the server 1210 may be decreased.

The server 1210 may identify an optimized combination among the candidate combinations based on an evaluation index (metric). The evaluation index may be an index for determining the similarity of a beam pattern. The server 1210 may obtain a combination of parameters that provide the beam pattern that is the most similar to the existing desired beam pattern. In this instance, a failed RF path does not operate, and thus, the element values of the failed RF path may be set to 0, which is a default value. For example, a phase value corresponding to the failed RF path may be set to 0, among the phase values of phase patterns of the antenna array that forms the beam pattern.

According to some embodiments, the server 1210 may identify an optimized combination based on a mean squared error (MSE) algorithm. The fact that beam patterns are similar to each other may mean that beam shapes are similar in three-dimensional space. The fact that two beam shapes are similar may mean that the distributions of the beamforming signal gain (e.g., a unit dB) at locations in three-dimensional space are similar. The server 1210 may obtain the beam shape of each of the plurality of combinations. The combination that has the minimum MSE (MMSE) may be identified to be the optimized combination, so that each beam shape has a gain distribution which is physically similar to that of the beam shape of the existing beam pattern. For example, the server 1210 may form a plurality of test points in a three-dimensional space (e.g., x, y, and z on a three-dimensional coordinate system), and may identify the combination of which the sum of the absolute values of the difference at each point is the minimum.

According to some embodiments, the server 1210 may identify the optimized combination based on predetermined beamforming metrics. Such a beamforming metric may be an index associated with the appearance of the formed beam. For example, the beamforming metric may include a half-power beam width (HPBW). The HPBW in a three-dimensional space may be set for each of an H axis and a V axis. For example, the beamforming metric may include a peak gain. For example, the peak gain may be the peak gain of a main lobe. For example, the beamforming metric may include a metric associated with USL repression. The metric associated with USL repression may indicate the degree of repression of a side lobe generated during beamforming, compared to a main lobe.

The server 1210 may determine at least one of the beamforming metrics, and may compare the existing beam pattern with the beam pattern of each of the candidate combinations based on the determined beamforming metric. The server 1210 may identify the candidate combination having the minimum difference from the existing beam pattern as the optimized combination. If two or more beamforming metrics are determined, the server 1210 may assign a weight to each of the beamforming metrics, and may identify the candidate combination that minimizes the weighted sum of the beamforming metrics as the optimized combination. Each weight may be set to a designated value according to the settings of the server.

According to various embodiments, the server 1210 may identify the optimized combination based on additional control of the beamforming parameter as well as the beamforming metric. According to some embodiments, if power boosting for each path is available, the server 1210 may obtain a power margin for each RF path, and may determine candidate combinations by taking into consideration the same so as to identify a combination optimized for a power parameter. According to some other embodiments, the server 1210 may perform power boosting with respect to power amplifiers of all RF paths by taking into consideration a total power margin. Since overall power boosting is performed, a beam shape is physically changed, and thus the optimized combination may be different from what it was before power boosting.

In operation 1205, the server 1210 may transmit beamforming parameter information to the base station 110. The base station 110 may receive the beamforming parameter information from the server 1210. The beamforming parameter information may indicate the optimized combination of the beamforming parameters identified in operation 1203. The beamforming parameter information may indicate the combination of an amplitude value and a phase value of a complex weight to be applied to each RF path of the base station 110. For example, the beamforming parameter information may include a phase value to be input to the phase shifter and a power value to be input to the power amplifier of a predetermined available RF path. For example, the beamforming parameter information may include a variation in the default value of each of a phase value and a power value currently set for a beamforming pattern. By applying the variation to the default value, the base station 110 may obtain beamforming parameter values of the optimized combination.

In operation 1207, the base station 110 may generate a beam pattern. The base station 110 may generate a beam pattern according to the beamforming parameters received in operation 1205. The beamforming parameters may include at least one selected from among a phase pattern, a power pattern, a change in a phase value of a predetermined RF path, a change in a power value of a predetermined RF path, a phase value of a predetermined RF path, and a power value of a predetermined RF path.

Although descriptions with reference to FIG. 12 have been provided by assuming a base station and a server as examples of a communication node, the various embodiments are not limited thereto. According to various embodiments, additional communication nodes may be further included between the node that provides a radio access network and a management server of an operator. According to an embodiment, a separate device may be additionally disposed after the management server. In order to share the amount of operations, additional nodes may respectively perform operations depending on the situation. Hereinafter, an example of implementing an optimization algorithm in the above-mentioned hierarchical structure will be described with reference to FIG. 13.

Figure 13:
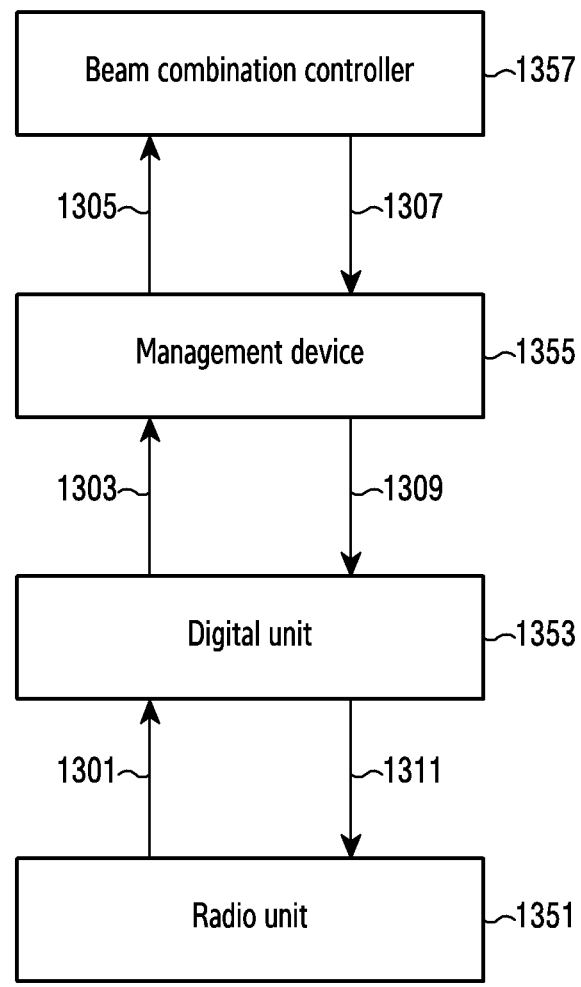
FIG. 13 is a diagram illustrating an example of the hierarchical structure of communication nodes for performing optimization recovery in a wireless communication system according to an embodiment of the disclosure.

FIG. 13 is a diagram illustrating an example 1300 of the hierarchical structure of communication nodes for performing optimization recovery in a wireless communication system according to an embodiment of the disclosure.

The optimization recovery according to various embodiments may include procedures such as detection of RF path failure, failure reporting, transmission of an optimized combination, and generation of a beam pattern. If the hierarchical structure is tightened, a failure-reporting procedure and an optimized combination-transmitting procedure may be added for each layer.

Referring to FIG. 13, operations 1301, 1303, and 1305 may be failure-reporting procedures, and operations 1307, 1309, and 1311 may be optimized combination transmission procedures. The hierarchical structure 1300 may include a radio unit 1351, a digital unit 1353, a management device 1355, and a beam combination controller 1357.

The radio unit 1351 may be a communication node that provides a beamforming wireless environment, and may include an MMU. The radio unit 1351 may determine whether beam pattern recovery itself is allowed. If beam pattern recovery itself is not allowed, or the amount of operations to be performed exceeds the capability of the radio unit 1351, the radio unit 1351 may request an upper node to perform beam pattern recovery. In operation 1301, the radio unit 1351 may transmit information for requesting the digital unit 1353 to perform beam pattern recovery. According to some embodiments, the request information may correspond to failure report information or information associated with the beamforming unit of FIG. 12.

The digital unit 1353 may manage a wireless environment of the radio unit 1351, and may be in charge of control signaling related to communication of a terminal within the wireless environment. The digital unit 1353 may determine whether beam pattern recovery itself is allowed. If beam pattern recovery itself is not allowed, or if the amount of operations to be performed exceeds the capability of the digital unit 1353, the digital unit 1353 may request an upper node to perform beam pattern recovery. In operation 1303, the digital unit 1353 may transmit information for requesting the management device 1355 to perform beam pattern recovery. According to some embodiments, the request information may correspond to failure report information or information associated with the beamforming unit of FIG. 12.

The management device 1355 may be an upper network entity which is located in a core network and is configured to perform a predetermined function, or may be an operator's management server (e.g., the server 1210 of FIG. 12) that manages a base station. The management device 1355 may be more capable of performing operations than the radio unit. The management device 1355 may determine whether beam pattern recovery itself is allowed. If beam pattern recovery itself is not allowed, or if the amount of operations to be performed exceeds the capability of the management device 1355, the management device 1355 may request a separate module to perform beam pattern recovery. In operation 1305, the management device 1355 may transmit information for requesting the beam combination controller 1357 to perform beam pattern recovery. According to some embodiments, the request information may correspond to failure report information or information associated with the beamforming unit of FIG. 12.

The reporting procedures in operations 1301, 1303, and 1305 may be performed periodically, or may be performed aperiodically in response to the occurrence of an event.

The beam combination controller 1357 may be a module including an optimization tool. The beam combination controller 1357 may be a module that implements the optimization algorithm, which has been described in FIG. 12. According to an embodiment, the beam combination controller 1357 may be a hardware device separate from the management device 1355, and may be connected to the management device 1355. For example, the beam combination controller 1357 may be a device including a plurality of operation-processing devices. For example, the beam combination controller 1357 may be a cloud server that supports cloud computing. According to another embodiment, the beam combination controller 1357 may be software that implements a predetermined algorithm. As an example, the beam combination controller 1357 may be implemented in the management device 1355. As another example, the beam combination controller 1357 may be installed within another network entity. As another example, the beam combination controller 1357 may be implemented in the radio unit 1351 (or DU). In other words, at least a few of the entities of the hierarchical structure 1300 of FIG. 13 (the radio unit 1351, the digital unit 1353, the management device 1355, and the beam combination controller 1357) may be disposed in the same equipment.

The beam combination controller 1357 may determine all possible candidate combinations within the control range of controllable beamforming parameters of the radio unit 1351 based on reported information. The beam combination controller 1357 may identify the combination that provides the most similar beam pattern, that is, the most similar beam coverage, to the existing beam pattern, among the possible candidate combinations, to be the optimized combination, via the optimization algorithm.

Subsequently, the beam combination controller 1357 may transmit information indicating the optimized combination to the management device 1355 in operation 1307. Subsequently, the management device 1355 may transmit the information indicating the optimized combination to the digital unit 1353 in operation 1309. Subsequently, the digital unit 1353 may transmit the information indicating the optimized combination to the radio unit 1351 in operation 1311. The radio unit 1351 may generate a beam pattern by applying beamforming parameters obtained based on the optimized combination. The generated beam pattern may have a beamforming metric which is similar to that of the existing beam pattern.

The number of antenna elements tends to increase gradually, such as 32T or 64T, compared to the legacy 4T4R (4TX(transmit), 4RX(receive)) structure. Each antenna element of an antenna is implemented as an active element, and may have a higher failure probability than the legacy structure. Since the failure probability increases, exchanging an element every time that failure occurs is inefficient. Beam pattern recovery according to various embodiments can overcome inefficiency and can maintain a service environment even when a problem occurs in an RF path.

The disclosure mainly provides a description associated with operations performed by a communication node in order to recover a beam pattern. However, a procedure of detecting an RF path failure before a beam pattern recovery (that is, the communication node performs a procedure of detecting an RF path failure according to FIGS. 7 and 8B although a beam pattern is not recovered) and procedures subsequent to the beam pattern recovery may also be understood as embodiments of the disclosure. According to an embodiment, after beam pattern recovery, if an RF path is changed and operates normally, the communication node may operate to apply beamforming parameters of the existing beam pattern. According to an embodiment, if the communication node is rebooted, the communication node may inquire about a recovery history, and may operate to apply beamforming parameters corresponding to the most recently recovered beam pattern.

Although the description of the disclosure is provided assuming, as an example, a common beam pattern for a signal transmitted in common to a plurality of terminals, it is a matter of course that the beam pattern recovery algorithm of the disclosure may be applicable to a user-specific beam pattern. Although it is illustrated that a network node such as a base station performs beam pattern recovery, this, of course, may be applied to a terminal having a plurality of antennas.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a communication node in a wireless communication system, the method comprising:
   generating a default beam pattern by applying a set of default beamforming parameters to a plurality of radio-frequency (RF) paths;
   detecting a path failure associated with at least one RF path among the plurality of RF paths;
   obtaining a set of recovered beamforming parameters for one or more available RF paths except the at least one RF path from the plurality of RF paths; and
   generating a recovered beam pattern by applying the set of recovered beamforming parameters to the one or more available RF paths,
   wherein, in case that a total number of the at least one RF path associated with the path failure is smaller than a threshold, the set of recovered beamforming parameters are identified among candidate sets using the one or more available RF paths in the communication node, based on a shape of the default beam pattern, and wherein, in case that the total number of the at least one RF path associated with the path failure is not smaller than the threshold, the set of recovered beamforming parameters are received from a server.

2. The method of claim 1, wherein the obtaining of the set of recovered beamforming parameters comprises:
in case that the total number of the at least one RF path associated with the path failure is not smaller than the threshold, transmitting, to the server, a message for indicating the detection of the path failure, the message including information on the at least one RF path associated with the path failure; and
receiving, from the server, information indicating the set of recovered beamforming parameters.

3. The method of claim 2, wherein the set of recovered beamforming parameters comprise:
a phase value of a phase shifter included in each RF path of the one or more available RF paths, and
a power value of a power amplifier included in each RF path of the one or more available RF paths.

4. The method of claim 1, wherein each set of the candidate sets comprises a combination of a possible phase value of the phase shifter and a possible power value of the power amplifier.

5. The method of claim 1,
wherein the obtaining of the set of recovered beamforming parameters comprises:
in case that the total number of the at least one RF path associated with the path failure is smaller than the threshold,
determining a power margin associated with the at least one RF path; and
increasing a power values of a power amplifier included in the one or more available RF paths, based on the power margin.

6. The method of claim 1,
wherein the set of the recovered beamforming parameters are identified from a lookup table (LUT) comprising the candidate sets.

7. The method of claim 1,
wherein each RF path of the plurality of RF paths is connected to a single phase shifter and a single power amplifier, and
wherein each RF path of the plurality of RF paths is connected to at least one antenna element among a plurality of antenna elements of an antenna array of the communication node.

8. The method of claim 1,
wherein the set of recovered beamforming parameters are used to generate the recovered beam pattern without using the at least one RF path.

9. The method of claim 1, wherein the shape of the default beam pattern comprises a main lobe of the default beam pattern.

10. The method of claim 1, wherein the set of recovered beamforming parameters are identified to minimize a difference between the default beam pattern and the recovered beam pattern.

11. A communication node apparatus in a wireless communication system, the apparatus comprising:
at least one transceiver; and
at least one processor configured to:
generate a default beam pattern by applying a set of default beamforming parameters to a plurality of radio-frequency (RF) paths,
detect a path failure associated with at least one RF path among the plurality of RF paths,
obtain a set of recovered beamforming parameters for one or more available RF paths except the at least one RF path from the plurality of RF paths, and
generate a recovered beam pattern by applying the set of recovered beamforming parameters to the one or more available RF paths,
wherein, in case that a total number of the at least one RF path associated with the path failure is smaller than a threshold, the set of recovered beamforming parameters are identified among candidate sets using the one or more available RF paths in the communication node, based on a shape of the default beam pattern, and
wherein, in case that the total number of the at least one RF path associated with the path failure is not smaller than the threshold, the set of recovered beamforming parameters are received from a server.

12. The apparatus of claim 11, wherein the at least one processor is, to obtain the set of recovered beamforming parameters, further configured to:
in case that the total number of the at least one RF path associated with the path failure is not smaller than the threshold, transmit, to the server, a message for indicating the detection of the path failure, the message including information on the at least one RF path associated with the path failure, and
receive, from the server, information indicating the set of recovered beamforming parameters.

13. The apparatus of claim 12, wherein the beamforming parameters comprise:
a phase value of a phase shifter included in each RF path of the one or more available RF paths, and
a power value of a power amplifier included in each RF path of the one or more available RF paths.

14. The apparatus of claim 11, wherein each set of the candidate sets comprises a combination of a possible phase value of the phase shifter and a possible power value of the power amplifier.

15. The apparatus of claim 11, wherein the at least one processor is, to obtain the set of recovered beamforming parameters, further configured to:
in case that the total number of the at least one RF path associated with the path failure is smaller than the threshold, determine a power margin associated with the at least one RF path, and
increase a power values of a power amplifier included in the one or more available RF paths, based on the power margin.

16. The apparatus of claim 11,
wherein the set of the recovered beamforming parameters are identified from a lookup table (LUT) comprising the candidate sets.

17. The apparatus of claim 11,
wherein each RF path of the plurality of RF paths is connected to a single phase shifter and a single power amplifier, and
wherein each RF path of the plurality of RF paths is connected to at least one antenna element among a plurality of antenna elements of an antenna array of the communication node apparatus.

18. A server apparatus in a wireless communication system, the apparatus comprising:
at least one transceiver; and at least one processor configured to:
receive, from a communication node, information indicating a detection of a path failure associated with at least one radio-frequency (RF) path among a plurality of RF paths of the communication node, wherein a total number of the at least one RF path associated with the path failure is not smaller than a threshold,
identify a set of recovered beamforming parameters to form a recovered beam pattern using one or more available RF paths different from the at least one RF path among the plurality of RF paths, among candidate sets, and
transmit, to the communication node, information indicating the identified set of recovered beamforming parameters,
wherein the set of recovered beamforming parameters are identified among candidate sets using the one or more available RF paths, in the server apparatus based on a shape of a default beam pattern.

19. The apparatus of claim 18,
wherein each set of the candidate sets comprises a combination of a possible phase value of a phase shifter and a possible power value of a power amplifier, and
wherein the set of recovered beamforming parameters are identified to minimize a difference between the default beam pattern and the recovered beam pattern.

20. The apparatus of claim 19, wherein the beamforming parameters comprise:
a phase value of a phase shifter included in each RF path of the one or more available RF paths, and
a power values of a power amplifier included in each RF path of the one or more available RF paths.

* * * * *